(12) United States Patent
Coker

(10) Patent No.: US 11,507,556 B2
(45) Date of Patent: Nov. 22, 2022

(54) METHOD AND SYSTEM FOR ENCAPSULATING AND STORING INFORMATION FROM MULTIPLE DISPARATE DATA SOURCES

(71) Applicant: ENCAPSA TECHNOLOGY LLC, Jacksonville, FL (US)

(72) Inventor: Christopher B. A. Coker, Annandale, VA (US)

(73) Assignee: ENCAPSA TECHNOLOGY LLC, Herndon, VA (US)

(*) Notice: Subject to any disclaimer, the term of this patent is extended or adjusted under 35 U.S.C. 154(b) by 61 days.

(21) Appl. No.: 16/943,645

(22) Filed: Jul. 30, 2020

(65) Prior Publication Data
US 2020/0394171 A1    Dec. 17, 2020

Related U.S. Application Data

(63) Continuation of application No. PCT/IB2019/050762, filed on Jan. 30, 2019.

(60) Provisional application No. 62/623,626, filed on Jan. 30, 2018.

(51) Int. Cl.
| | | |
|---|---|---|
| G06F 16/00 | (2019.01) | |
| G06F 16/22 | (2019.01) | |
| G06F 16/2455 | (2019.01) | |
| G06F 16/28 | (2019.01) | |
| G06F 16/25 | (2019.01) | |
| G06F 16/23 | (2019.01) | |

(52) U.S. Cl.
CPC ...... *G06F 16/2291* (2019.01); *G06F 16/2365* (2019.01); *G06F 16/24562* (2019.01); *G06F 16/258* (2019.01); *G06F 16/289* (2019.01)

(58) Field of Classification Search
None
See application file for complete search history.

(56) References Cited

U.S. PATENT DOCUMENTS

| | | | | |
|---|---|---|---|---|
| 8,332,613 | B1* | 12/2012 | Glade | G06F 3/067 |
| | | | | 711/E12.001 |
| 8,504,590 | B2* | 8/2013 | Coker | G06F 21/6227 |
| | | | | 707/802 |
| 2010/0274788 | A1* | 10/2010 | Coker | G06F 16/289 |
| | | | | 707/769 |

OTHER PUBLICATIONS

Burleson D. "Object SQL, Pointers and Encapsulation", Jan. 14, 2018, http://www.dba-oracle.com/t_object_sql_pointers.htm, 4 pages. (Year: 2018).*

* cited by examiner

*Primary Examiner* — Bai D Vu
(74) *Attorney, Agent, or Firm* — Charter IP LLC; Matthew J Lattig

(57) ABSTRACT

An example computer-implemented method and computer system, each adapted for encapsulating digital data records in multiple, differently structured and unstructured formats, the data records ingested from multiple data storage locations, is described herein. In the method, each ingested data record is separated into a plurality of tuple structures, and for each tuple, the tuple is split into a data part and fieldname part. A pointer is created by combining the fieldname part, a record identifier of the data record, and a database identifier of the storage location where the data record was stored. The pointer is appended to the data part to form a digital stem cell (DSC) that is stored in a single data store, each formed DSC having the same structure.

15 Claims, 17 Drawing Sheets

FIG. 12

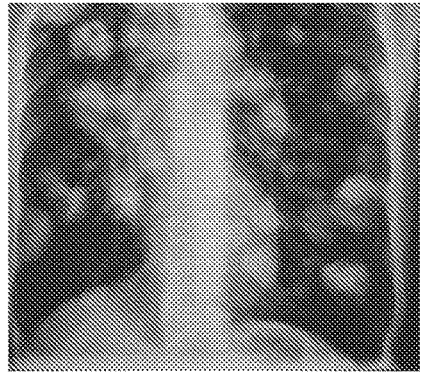

Add To Message

This describes the patient's current condition in narrative form. The Chief Complaint is a required element. The history or state of experienced symptoms is recorded in the patient's own words. It will include all pertinent and negative symptoms under review of body systems (ROS). Pertinent Medical History, Surgical History, Family History, Social History along with current medications and allergies are also recorded.

[Send]  300

*FIG. 19*

Replies

 Felicia Bassey Friday, February 3, 2017 5:04 PM

This describes the patient's current condition in narrative form. The Chief Complaint is a required element. The history or state of experienced symptoms is recorded in the patient's own words. It will include all pertinent and negative symptoms under review of body systems (ROS). Pertinent Medical History, Surgical History, Family History, Social History along with current medications and allergies are also recorded.

Add To Message  300

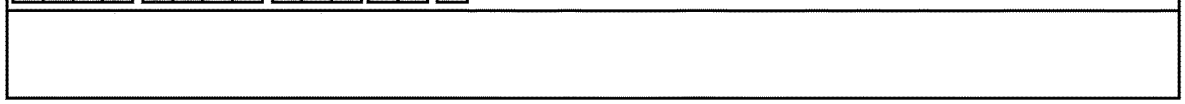

*FIG. 20*

METHOD AND SYSTEM FOR ENCAPSULATING AND STORING INFORMATION FROM MULTIPLE DISPARATE DATA SOURCES

CROSS-REFERENCE TO RELATED APPLICATIONS

The present application claims the benefit under 35 U.S.C. § 363, § 365(c) and § 120 of PCT International Application Serial No. PCT/IB2019/050762 to applicant ENCAPSA TECHNOLOGY LLC, filed Jan. 30, 2019, pending, which in turn claimed priority to U.S. Prov. Pat. Appl. Ser. No. 62/623,626 to the inventor, filed Jan. 30, 3018, now expired. The entire contents of each application is hereby incorporated by reference herein.

BACKGROUND

Field

Example embodiments in general relate to a computer system and computer-implemented method adapted to encapsulate and store information ingested from multiple disparate data sources.

Related Art

In the discussion of prior art in Applicant's commonly-assigned U.S. Pat. Nos. 7,752,231, 8,015,214, and 8,504,590, the entire contents of each being incorporated in their entirety by reference herein, it was noted that conventional databases which are set up to store user-associated information typically employ a proprietary "record" format. A record includes a number of fields which are uniform throughout a particular database. Records typically include (1) fields used to authenticate or identify users, and (2) fields used to store data associated with the users.

In an example, identifying fields may include a "First Name" field, a "Last Name Field", a "Social Security Number" field, etc., and/or any other well-known identification/authentication signature (e.g., a biometric signature of a user's fingerprint, retinal scan, etc.). In another example, data fields may include "Credit History", "Medical History", etc., and/or any other well type of user-associated data.

Databases using the same record fields can be merged with each using a common or shared communications interface protocol (CIP). For example, first and second databases may all include the same, or at least compatible, record field structures. The first and second databases may share and/or merge information, stored in their respective record fields, using a specific CIP because the record field structure of the first and second databases to be combined are identical. In this instance, First Name in database "A" routinely maps to First Name in database "B" or Credit History in database "B" routinely maps to Credit History in database "A".

However, different database orientations typically include proprietary record field structures with potentially incompatible field structures. For example, database A might have a different name representing the First name information than database B. (i.e. "Last Name" in Database A versus "Surname" in database B). In such cases, a set of databases cannot be accessed simultaneously to ingest the data records contained therein using a specific CIP, unless the dissimilar database employs a "translator or data mapping" application which establishes a standard associative field structure for both the known and dissimilar field structures of the ingested digital data records. This literally means that the field structure of database "A" is examined along with the field structure of database "B". Fields in database A are then physically matched to corresponding fields in database B to identify, to the CIP, that both field structures have the same type of information. This process is known as data mapping or data translation, and is especially undesirable when employing data management routines for big data applications.

This is because data mapping or translator applications are expensive to produce and maintain, and add both complexity and time to inter-database communications. The need to physically map each dissimilar field to an intermediary file can prove burdensome. Even if automated, the time and expense it would take each process to establish the standard and match each dissimilar element to it is significant.

Additionally, record fields are typically stored together in contiguous or adjacent memory address locations, such that identifying fields and data fields are in close, physical proximity to each other within conventionally-structured databases. Accordingly, if a conventional database is compromised by a hacker, the hacker can, with relative ease, combine the identifying fields with their associated data fields to obtain the relevance of the data fields.

Conventional techniques to reduce a hacker's success in extracting relevance from compromised data (e.g., by correctly associating compromised data with user-information) typically include adding layers of "active" encryption to database storage protocols. As an example, for an entire database configured to store numerous records, the database is encrypted such that the hacker cannot read any information from the database without obtaining a key to decrypt the database.

However, authorized users must also decrypt the database to access the information stored therein, which adds further laborious processing requirements and delays to database access. Further, if the hacker is able to successfully decrypt the database, the information present therein becomes readily available to the hacker in the conventional "ready-to-read" format (e.g., contiguous/adjacent memory address record field storage). Also, if an authorized user loses the key required to decrypt the encrypted database, the authorized user cannot access the database until he/she obtains a replacement key, which can also be a painstaking process (e.g., requiring re-authentication and distribution of the replacement key). As such, in developing its pioneering technology Applicant did so with an eye toward the numerous problems inherent in ingesting data records that comes from disparately-structured data storage sources.

Applicant's aforementioned commonly-assigned U.S. patents described methods and systems which in general introduced the concept of an "encapsulation" of information in an "encapsulated" database, whereby a message was partitioned into a plurality of object class entries in the database. Applicant defined an object class as one of a plurality of defined, hierarchical fields stored within the encapsulated database. As described herein, object classes include, in an order from highest-level to lowest-level within an object class hierarchy, the object classes Folder, Form, Topic and Data. A "data field" was described as a portion of an object class entry or in some cases all of an object class entry. Additionally, a data field class was used synonymously with object class, and represented one of a plurality of defined, hierarchical data fields stored within the encapsulated database.

Each of the object class entries constituted a portion of an object class from a plurality of object classes having a given hierarchy within the database. Pointers were generated, each pointing to one of the object class entries, which were stored in non-adjacent storage locations within the database. At least one of the plurality of object class entries was stored in association with the generated pointer such that it pointed to a higher-level object class entry, as determined by the hierarchy.

SUMMARY

An example embodiment of the present invention is directed to a method of encapsulating digital data records having multiple, differently structured and unstructured formats, the data records ingested from multiple different and disparate data storage locations. In the method, each ingested data record is separated into a plurality of tuple structures, and for each tuple, the tuple is split into a data part and fieldname part. A pointer is created by combining the fieldname part, a record identifier of the data record, and a database identifier of the storage location where the data record was stored. The pointer is appended to the data part to form a digital stem cell (DSC) that is stored in a single data store, each formed DSC having the same structure.

Another example embodiment is directed to a method of encapsulating multiple different data records having an unstructured or structured format, the data records contained in files stored across multiple databases, at least two databases of which have dissimilar structures. The method includes ingesting files containing the data records from the databases, and for each file, deconstructing one or more data records contained in the file into elemental parts having the same structure. The elemental parts are stored in a single data store. The stored elemental parts are adapted to be freely indexed and searchable irrespective of the original unstructured or structured format of the elemental parts' underlying data record, and irrespective of the database containing the file from which the underlying data record was ingested.

Another example embodiment is directed to a computer system adapted to encapsulate digital data records in multiple, differently structured and unstructured formats accessible from multiple data storage locations. The system includes an ingest client adapted to ingest a plurality of the digital data records from the multiple data storage locations, and a server node adapted to iterate object-based programming functions to separate each ingested data record into a plurality of tuples, split out a data part and a fieldname part from each tuple, create a pointer by combining the fieldname part, a record identifier of the data record, and a database identifier of the storage location where the data record was stored, append the created pointer to the data part to form a pointer pair which represents encapsulated data, each formed pointer pair having the same structure, and store the formed pointer pairs in a single data store of the server node. The system includes a response client adapted to, upon a user query to the system, de-encapsulate selected pointer pairs in the data store based on the query store, for display and analysis by the user of the original, underlying ingested digital data records associated with the pointer pairs.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

FIG. 12 is a screenshot showing the reformulated data records from the DSCs in the data layer, with a search term highlighted in selected results.

FIG. 19 is a screenshot illustrating the sender adding a message in the form of a chat or IM via the PMB system.

FIG. 20 is a screenshot illustrating the recipient's reply to sender.

DETAILED DESCRIPTION

Figure 1:
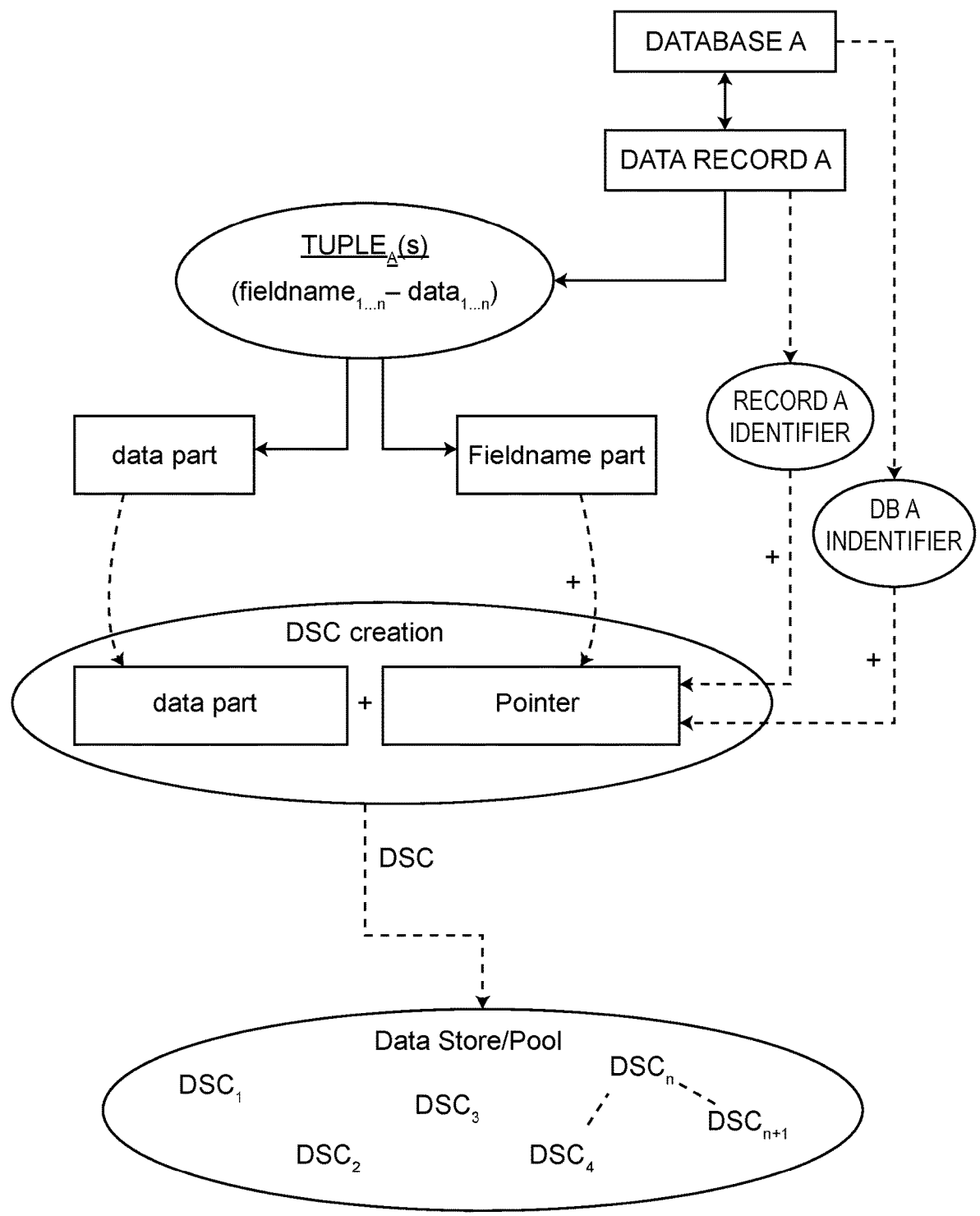
FIG. 1 is a simple diagram highlighting the essence of encapsulation.

In general, the example method described herein may be implemented in computer system and/or embodied as computer server software for indexing and making searchable data from any application, server or network device. Namely, the computer software is implemented by a computer system so as to ingest multiple different data records (a data record being in any structured or unstructured format, thus irrespective of structure), the data records contained within a file located in and across multiple data storage locations or databases. The ingested data records are then deconstructed into elemental parts having the same structure, and then stored in a single, common data store. The stored elemental parts are freely indexed and searchable irrespective of the original unstructured or structured format of the elemental parts' underlying data record, and irrespective of the database containing the file from which the underlying data record was ingested.

According, the stored elemental parts (e.g., the DSCs) are freely searchable (such as by query by a user via a GUI) in the single data store. Results of the search or query are displayed in the presentation layer as the originally ingested data records corresponding to those elemental parts within the single data store that form the search results. The results may be analyzed as desired.

The function of ingesting can be understood as an action of pulling the file containing one (or more) data records from the database where the file was located, and then looking at the file and what is in the file, such as the file structure and extension (.pdf, .jpeg, mov, .csv, etc.). The deconstructing function is akin to parsing the ingested data record in order to pull out only certain parts (data part and fieldname part) that eventually will be used for encapsulation (represented as the forming of the digital stem cell (DSC)) that is stored in a single data store. As such, only a fraction of each data record in a given file will actually be used for encapsulation.

The example method(s) may therefore be implemented by at least one computer system or computing device, and/or may be embodied as non-transitory computer readable information storage media or as a set of machine readable instructions stored in a storage device. Regardless of the underlying device or system, when iterating the example method described hereafter, the system or device is adapted to encapsulate information in the data layer, the information (i.e., any data source in a structured or unstructured format) having been ingested in the presentation layer as two or more disparate data storage sources are indexed to according to the method. Additional functional details invoked in the method by the system(s) are described hereafter.

In another alternative example, a website in communication with the inventive computer system for implementing the example method may be accessible by subscribers in a self-serve manner. In a further alternative example, a website describing services and/or functions of the exemplary method(s) and system(s) may be public-facing and serve essentially as a sales brochure for a downloadable app for a smart computing device. In addition to promoting the mobile app, the website may promote perspectives on various themes associated with a given computer program product, app, download, etc. through a link to an associated blog, which may be accessible through social media where, for example, the blog posts regularly to FACEBOOK®, TWITTER®, INSTAGRAM®, LINKED IN®, and the like.

A commercial platform envisioned for a consumer and/or business enterprise may be embodied in one, some or all of a downloadable software product, off-the-shelf retail software product purchased for installation, a self-serve website with or without downloadable app and/or software for download, or both, each implementation based on the example computer system(s) and/or computer-implemented method described in greater detail hereafter. The commercial platform, as embodied by the inventive method(s) and/or computer system(s), may be directed to, implanted, pointed to, or otherwise installed as middleware into or on any kind of peer-to-peer (P2P) file sharing systems and/or services, server node(s), existing software suite(s), and/or enmeshed in any kind of existing or future protocol designed for the internet, an intranet, a P2P file sharing service, intra-networks, etc.

In one example noted above, the inventive method may be part of a downloadable or transferable (over any communication medium) smart device app including but not limited to: (a) B2C direct via the mobile app downloaded from a digital distribution service such as the GOOGLE PLAY™ AMAZON® Appstore and/or App Store by APPLE®; (b) a B2B relationship whereby users may be licensed to and/or offered to under a designated brand (e.g., consumers, smaller businesses, affinity groups, their agents and the like); and/or (c) a B2B relationship whereby the licensing entity rebrands the service for integration into their product suite (e.g., larger enterprise suites and/or corporations, national governments and the like).

As will be appreciated by one skilled in the art, the example embodiments of the present invention may be embodied as a computing system, computing device, computer-implemented method, set of machine-readable instructions and associated data in a manner more persistent than a signal in transit, non-transitory computer-readable media, and/or as a computer program product or downloadable mobile app product for a mobile device. Accordingly, aspects of the example embodiments may take the form of an entirely hardware embodiment, an entirely software embodiment (including firmware, resident software, microcode, etc.) or an embodiment combining software and hardware aspects that may all generally be referred to herein as a "circuit," "module", or "system." Furthermore, aspects of the example embodiments may take the form of a computer program product embodied in one or more computer-readable medium(s) having computer-readable program code/instructions embodied thereon.

As used herein, the term "data" is defined as a unique segment of information which joins to other segments of information ("digital data") to form a meaningful and recognizable knowledge stream. In the context of the example embodiments described hereafter, the data to be ingested from disparate storage locations is generically referred to as a "data record" or "data records" collectively, and/or occasionally as digital data.

However, it should be understood that the various types of digital data or information ingested from disparate data stores (such as databases, server stores, and the like) include but are not limited to, by example, the aforementioned data records (and/or tables or other tabular data in various formats), input forms such as a web forms, images such as pdf or jpeg files with associated metadata, etc., video/movie/ streaming files in various file formats, audio files in various formats, other editable files and/or documents in various formats (e.g., formats such as those associated with any of a word processing file, any data or database file, spreadsheet file, compressed file, disc and media file, executable file, font file, internet-related file, presentation file, programming file, system-related file, and the like), text messages, electronic mail messages, files or records associated with social media-related postings, and also includes any document or file structure or type containing data which has not heretofore been developed but which may be created, developed, envisaged, or anticipated in the future.

As used herein a "storage location" (in its singular or plural) by example includes but is not limited to databases (e.g., relational, object-oriented, key-value), data stores such as distributed or open source data stores, simple files such as spreadsheets, email storage systems (client and server), and the like. A storage location also may be envisaged in a broader sense within a class of storage systems that include file systems, directory services for networks, and files that store virtual machines such as a VMware data store. Further, a storage location herein includes and pool, container, or other storage system which has not heretofore been developed but which may be created, developed, envisaged, or anticipated in the future. For the purposes of simplicity and convenience only hereafter, a storage location from which a data record is to be ingested for encapsulation shall be referred to primarily as a database As used herein, the term "tuple" may be defined as a finite function that maps each fieldname field in a data record (hereafter "Fieldname") to a certain data field or a certain value in the data record (hereafter "Data"), e.g., Tuple=Fieldname+Data. A tuple may be synonymous with and is also referred to occasionally hereafter as a "data-fieldname pair". As used herein, the term "pointer" means information that identifies the tuple or fieldname-data pair, and which occasionally may be referred to as an "identifier" or "identifying information". This identifying information includes but is not limited to: the record identifier for the data record, the database identifier which identifies the database from which the data record (and hence the fieldname-data pair or tuple) has been ingested, and additional elements or fields associated with the data record (e.g., a timestamp, owner, geographic location, etc.)).

As employed hereafter, the phrase "Digital Stem Cell", also known or referred to hereafter as a "DSC" or occasionally referred to as a "pointer pair", represents a Data part+Pointer, and is representative of the underlying digital data or information (such as one or more data records as defined above) ingested from the presentation layer. Alternatively, the Data part+pointer that forms the DSC or pointer pair may be occasionally referred to as simply "elemental parts". A DSC (or the elemental parts) or pointer pair is the end result of encapsulation, whereby each fieldname-data pair (tuple) in a data record that has been ingested from a storage location such as a database has been split or separated into a data part and a fieldname part, a pointer has been created, with the pointer then appended to the data part to form the DSC (pointer pair). As will explained in more detail below, the pointer in general is created by combining the previously-noted identifier information (record identifier, database identifier, additional identifying elements) with the fieldname part that was split from the fieldname-data pair. The formed pointer is then appended to the data part to form the DSC. Each DSC is stored within the data layer in a common storage location, pool, or container known as a "data store".

The phrase "data store" (also occasionally referred to as an "encapsulated data store", "data warehouse", or "data pool") hereafter represents a single container, pool, or storage location having no structural limitations, where a plurality of these freely associated DSCs are stored. As such, the data store is simply a collection of freely associated, individual DSCs. Unlike traditional database structures, there are no structural barriers in the data store.

The meaning of the term "encapsulation" as used hereafter is the process of creating and storing these DSCs in the data store. Thus, encapsulation represents Applicant's enabling process to merge data records (e.g., digital data elements, records, and the like as noted above) that are ingested, received or accessed from disparate databases (e.g., storage locations, systems and the like as noted above) from the presentation layer, into the data store within the data layer by converting the ingested data records into representative DSCs within the data layer.

Additionally as used hereafter, the phrase "enCapsa objects" (or occasionally also referred to as simply "objects") may be understood as programming functions adapted to encapsulate or (de-encapsulate) digital data within either a middle or business layer, or in the data layer, depending on the configuration. The enCapsa objects are adapted or configured to both create DSCs in the data layer and also "re-form" the originally ingested digital data (such as data records) from the DSCs in the presentation layer.

Moreover, in the context of this detailed description, the phrase "object library" refers to a library that is represented as a series of programming constructs in the form of exposed functions (the enCapsa objects) that allow encapsulation to form the DSC (or de-encapsulation of the DSC to reconstruct the original data record). In this respect, enCapsa objects are configured so as to pass data between the presentation and data layers. For example, the objects might take a data record from an input or ingested form (as a DSC) and pass it to the data store and, conversely, take the DSC from the data store to something in the presentation layer, e.g., like a dashboard to re-construct the data record from the DSC based on a search query, for example.

FIG. 1 is a simple diagram to highlight the essence of Applicant's process of encapsulation. Before delving into greater detail in regard to the exemplary computer-implemented method(s) and computing systems(s), Applicant provides an overview for purposes of context, and for a follow-on discussion of certain themes or properties attributable to their encapsulation technology.

The essence of Applicant's encapsulation methodology is that any data record in any database can be broken down into fieldname-data pairs (or tuples) to create Digital Stem Cells (DSCs). The general idea is that one can take digital data (such as a data record) from any storage location within the presentation layer, such that within the data layer the data record is separated into a plurality of fieldname-data ingested from the underlying data record. As such, since only these two fields are parsed or pulled out form the underlying data record, structure of the data record becomes a non-issue. In other words, the structure of the underlying data source and the data itself is not taken into consideration.

Recall that each ingested data record is deconstructed into elemental parts having the same structure. The elemental parts are adapted to be freely indexed and stored in a single data store. The stored elemental parts are freely searchable (such as by query by a user via a GUI) in the single data store irrespective of the original format (structured or unstructured) of the data record or the data source from which the data record is ingested. Results of the search are displayed as the originally ingested data records corresponding to their elemental parts as stored within the single data store. The results may be analyzed as desired.

Accordingly, and in real time, each fieldname-data pair is separated into a data part and a fieldname part, and almost simultaneously a pointer is created and the DSC is formed from the pointer and fieldname-data pair, hence the above-described elemental parts that are freely searchable in the data store. Namely, the pointer is created by combining the fieldname part split out from the pair, the identifier information associated with the data record (record identifier for the data record), and the database identifier which identifies the database that is indexed to in order to ingest the data record stored therein. The now-formed pointer (fieldname+record identifier+database identifier) is appended to the data part that was split from the fieldname-data pair to form the DSC. As noted above, the pointer contains all the identifier and positional information that ties the data field of the data record to its source storage location (its database).

This is shown by FIG. 1, in which an input, retrieved or ingested "data record A" from "database A" in the presentation layer is comprised of a numbers of fields, but only the fieldname field and the data field of data record A is parsed out for encapsulation. Namely, the ingested digital data is encapsulated in the middle or data layers by first breaking down this data from data record A into tuples (i.e., fieldname-data pairs (fieldname$_{1...n}$-data$_{1...n}$)), splitting each pair into a fieldname part and a data part, and then creating a pointer using the split fieldname part and identifying information for the data part (identifiers shown by dotted line arrows). The pointer thus formed is then appended to the data part to realize a "pointer pair" which is represented as the newly created DSC. The ingesting, breaking down into tuples which are then split out to form the pointer that is combined with the data part represents encapsulation, the birth of the DSC. The DSC thus formed by encapsulation is stored in a common, singular data store with other freely associating DSCs within the data layer. This freely associative nature in a single common data store is analogous to a fish in a school of fish swimming freely within the ocean. Hence, there are no structural barriers.

Creating these DSCs gives certain properties to the tuple, namely: independence, plasticity, uniformity, hierarchy, security, and portability. These properties allow data from disparate systems to co-exist securely within a single store and allow them to be connected. The encapsulation process creates units of data that are self-referencing and able to stand by themselves within a specific pool of data. Each DSC contains all the knowledge it needs to recreate its position in the original database or data store. It also has the ability to exist with other DSCs from other databases or data stores within a common data pool making, by extension, data from different databases or data stores exist in the same space.

DSCs and what is inherent in the concept of the unitary or common single data store can create what is called "linked data", the enabling concept behind what is known as the Semantic Web. The idea of the Semantic Web is to make it so that data can be linked to other data in a meaningful way so that it can be followed by machines and not necessarily humans. That is, machines should be able to establish a logical path between two or more items of information. For example, John "is the parent of" Janet. As will be shown and described in more detail hereafter, Applicant's encapsulation method has a direct relationship to the concept of linked data.

The common idea behind the Semantic Web and linked data is that, if a user conducts a search for "John Smith", the user should be able to find John Smith's children or his last three addresses. With encapsulation, if the user searches the data pool for all the data elements belonging to "John Smith", they should be able to further narrow this down to anything related to "John Smith" simply by increasing the number of required common elements that must be satisfied as return results. So, if the user posits that all results must meet the terms "John", "Smith", "Street Address", "City", "State" and "ZIP Code" all those DSCs that meet this criteria will be returned. Presumably, anybody who lives or lived at that address, (i.e., John Smith's wife and children) will show up.

These searches are evaluated at the level of the DSC. The data part of the pointer pair that is the DSC is being searched in order to return all data pairs that meet the criteria mentioned. This is done for a reason. Namely, searching the DSCs removes the need to consider structure in searches or queries in the presentation layer. That is, the field name does not have to be mentioned in a search; rather, just a list of terms that are being searched for, such as a name, a city, an occupation, a SSN, and the like. The pointer of the DSC tells the user what field, record, database, data store or document the DSC belongs to.

Again, it is important to note that, at the start of the search, structure of the underlying data source and the data itself is not taken into consideration. The benefit of employing Applicant's method of encapsulation is that any document, database or data store on the planet can be searched. This is powerful because it also means that any search will pull up not just the document or database record that is being looked for, but also (if one increases the number of terms) all the things that the document or database record is about, close to, or refers to—that is, the things it relates to.

Adding to this is the notion that in the common data store the notion of proximity searches among DSCs is really a search for data in quite different databases or data repositories. One can thus envisage a Web or HTML based system that allows you to enter at the "http://" request line a search term, click on any displayed record and be taken to all the records that are related to it.

The process of encapsulation also adds certain, very-specific properties to the ingested digital data, including hierarchy and uniformity, removes the need to create and manage schemas, allows the ingested digital data to reside anywhere, and allows the DSC to store anything. In other words, the DSC can contain anything; that is, the data part of the DSC can be anything. For the uniformity property, a DSC only has to be defined once. Once defined, copies of it can be used again and again to house different data values. By only having to define a DSC once, different entities can share the same field names such as "address" or "phone number" without having to define them again.

For the hierarchy property, a concept that was generally introduced in Applicant's early U.S. patents, each DSC can be part of collections that in turn may be part of other collections. Data in the single data store or pool thus becomes hierarchical, as each DSC carries information through the data record, and database identifiers carry information on the entity areas or collections it belongs to. This is analogous to a document referencing the folder that contains it.

These and other properties of a DSC makes any database infinitely extensible and relatively secure. These properties also permit information from different data storage locations, databases and/or systems, no matter how differently they are structured, to exist in a single space, the common data pool. The possibility for all data to reside in one space means that all data is searchable, regardless of its underlying structure. Searches can take place efficiently and at greater speed simply because all the ingested digital data reside in the same space.

Figure 2:
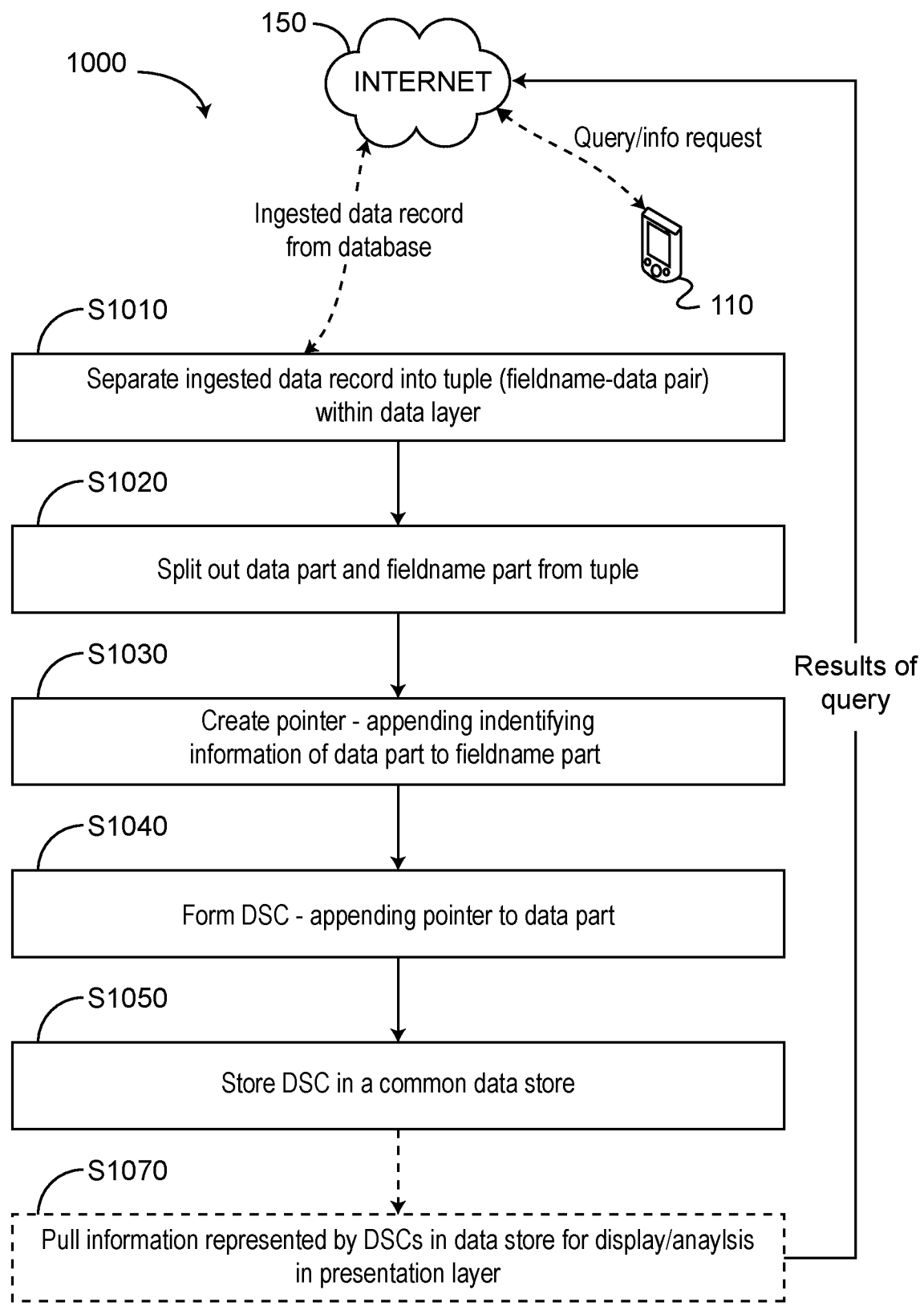
FIG. 2 is a flow diagram to describe a method of encapsulating digital data records according to the example embodiments.

FIG. 2 is a flow diagram to describe a method of encapsulating digital data records in multiple, differently structured and unstructured formats, the digital data having been ingested in the presentation layer from multiple storage locations across the internet 150, according to the example embodiments. For exemplary purposes only, the method is shown in the context of a web user 110 entering a query on the internet 150, such as via a browser.

In method 1000, each ingested data record within the middle layer (or data layer as an alternative) is broken down or separated (step S1010) into one or more tuples (or fieldname-data pairs). For the purposes of FIG. 2 the method of encapsulation 1000 is shown for a single tuple of a data record, it being understood that thousands to millions (or more) encapsulations of tuples may be done per second or minute, depending on the rate of input of data, the processing power of the servers, and the storage space. For the step of ingesting, the files containing the data records are ingested, the files residing in the multiple data storage locations. Hence a given ingested file contains one or more ingested data records. The ingested data record may be understood as any combination of digital data in an unstructured format, and/or in a structured format in the presentation layer, such as multiple data records from various storage locations, where at least two of which have dissimilar field structures with respect to one another.

Next, the tuple is split out (step S1020) into its data part and its fieldname part. As previously noted, identifying information associated with the data part is combined with the split out fieldname part to create the pointer (step S1030). The identifying information includes at least the record identifier for the data record, and the database identifier which identifies the database from which the data record (and hence the fieldname-data pair or tuple) has been ingested.

The identifying information may also include additional elements or fields associated with the data record (e.g., a timestamp, owner, geographic location, etc.). The pointer includes information about its data part, and upon being appended to the data part (step S1040) forms the digital stem cell (DSC). As will be shown, each DSC includes information adapted to be reformed in a presentation layer so as to display the original, underlying data record that corresponds to the DSC for further analysis.

The separating, splitting, creating, and appending steps noted above represent an encapsulation of the ingested digital data record to create or form the DSC. As shown in more detail hereafter, the separating, splitting, creating, and appending functions are executed by object-based programming functions ("enCapsa objects" or simply "objects") adapted to both encapsulate and de-encapsulate the ingested data records.

Each DSC is then stored (S1050) in a common, single data store in the data layer. Each DSC further adapted to freely associate with other DSCs therein. For example, each stored DSC is freely searchable irrespective of the original structured or unstructured format of its underlying data record, and irrespective of the data storage location from which the data record was ingested, the stored DSCs co-existing without any structural barriers between them in the data store.

The stored DSCs may further be configured as encapsulated data of an extractable or exportable file, such as a .csv file, although any other file format configurable for export or extraction is envisioned herein. Additionally, the DSCs stored in the common data pool may be considered as a merged set, where a search or query is limited to selected tables in the pool. According, it is not necessary to employ any kind of data mapping process, algorithm, or subroutine, as is currently needed in combining digital data from multiple storage sources or databases which have incompatible field structures, as is often the case. The merged data set thus is embodied or represented by the stored DSCs, and can be merged or configured into an extractable or exportable file as noted above.

Optionally, and based on receiving an information storage request from a communication entity in the presentation layer (such as a query by the user 110) one or more of the DSCs are pulled from the data store (step S1060, dotted line box) for display and analysis in the presentation layer so as to access the original, underlying ingested digital data records associated with the DSCs. This function essentially reforms (or de-encapsulates) the originally ingested digital data records. The DSCs retrieved from the common data store in the data layer are thus de-encapsulated using objects for display and review of the original, underlying ingested digital data associated therewith.

The merged data set of DSCs may be adapted to be filtered based on at least one of a common word, phrase, and term. In one example, digital data may be searched in fields common to all unstructured and structured data formats, with the digital data aligned in successive rows by all common fields. The results from the searching and aligning functions may be saved as a new external file of encapsulated information.

Thus, unlike conventional merging of records or tables from disparate databases, which have incompatible field structures requiring a data mapping application to establish a standard associative field structure for both the known and the dissimilar field structures in the records/tables to be combined, the DSCs require no data mapping or translator application to perform a search, query or record retrieval in the presentation layer. This is because the encapsulation process does not require any field structures to initiate, constitute or propagate a search of DSCs stored in the common data store. In fact, no data mapping or translator application is required at any step in the encapsulation process, nor is any data mapping needed upon retrieval or downloading of the original, ingested underlying digital data associated with the DSCs to display in the presentation layer.

Accordingly, the described method for encapsulating and storing information from multiple disparate data sources illustrates how data records can be deconstructed into elemental parts, which can occur at the word level (as in input forms, data tables and metadata) or at the file level (PDFs, images, etc.) In each instance the word, document or image is encapsulated as a DSC and stored in an underlying data store (such as a LUCENE® big data store). Of note, the system/method herein is not a database itself; rather, encapsulation relies on the underlying data store, in this one example LUCENE, to perform persistence. Persistence is "the continuance of an effect after its cause is removed". In the context of storing data in a computer system, this means that the data survives after the process with which it was created has ended. In other words, for a data store to be considered persistent, it must write to non-volatile storage.

In this light, Applicant's method and system may be viewed a three-tiered model to broker a relationship between the data layer and the presentation layer. Namely, it serves as the middle layer to transform data requests and commands from the presentation layer into persistence in the data layer, by providing intelligence to transform an input form in the presentation layer into a specialized document in a data layer (such as a LUCENE data layer).

In one variant or implementation of the method, Applicant envisions whereby the above method of encapsulating information is performed in a smart computing device. The smart computing device may include but is not limited to one or more of a personal digital assistant, laptop, cell phone, tablet personal computer, RFID device, laser-based communication device, LED-based communication device, mobile navigation system, mobile entertainment system, mobile information system, mobile writing system and text messaging system. The common data store described above is configurable to be part of the device, or connected to the device, stored on but not connectively integrated with the device, or generated or hosted by the device. Also, the data store is adapted to be at least one of transmitted, transferred, transformed or translated by the device.

In another variant or implementation of the method, Applicant envisions a non-transitory, computer-readable information storage media having stored thereon information. When the stored information is executed by a processor the above encapsulation method is iterated. In another potential commercial application, Applicant envisions a control method embodied as a middleware product, which is configured to perform the steps of FIG. 2. Namely, this could be commercially sold as a "plug-and-play" middleware product or middleware which lays on top of an existing infrastructure, system, network, and the like. The middleware encapsulates digital data in multiple, differently structured and unstructured formats that is ingested from multiple data storage locations.

In another commercial implementation of the method, Applicant envisions the development of a search engine (private or public-facing) for presenting information in a presentation layer based on a query by a user. The search engine may include one or more computers and one or more storage devices storing instructions that are operable, when executed by the one or more computers, to cause the one or more computers to perform the steps in method 1000 so as to present the information collected in response to the query to the user.

A further specially-envisaged commercial application is in the form of a peer-to-peer (P2P) file sharing service which is adapted to iterate method 1000. In this implementation, the P2P service has its own P2P network with one or more nodes, and implementation of the method shown in FIG. 2 would invoke a data browser enabling a user or machine to access media file content (such as books, music, video files inclusive of movies and episodic series content, video or electronic games, etc.) by searching other connected computers on the P2P network to locate the desired content. In an example, one or more nodes of the P2P network are end-user computers and distribution servers.

Figure 3:
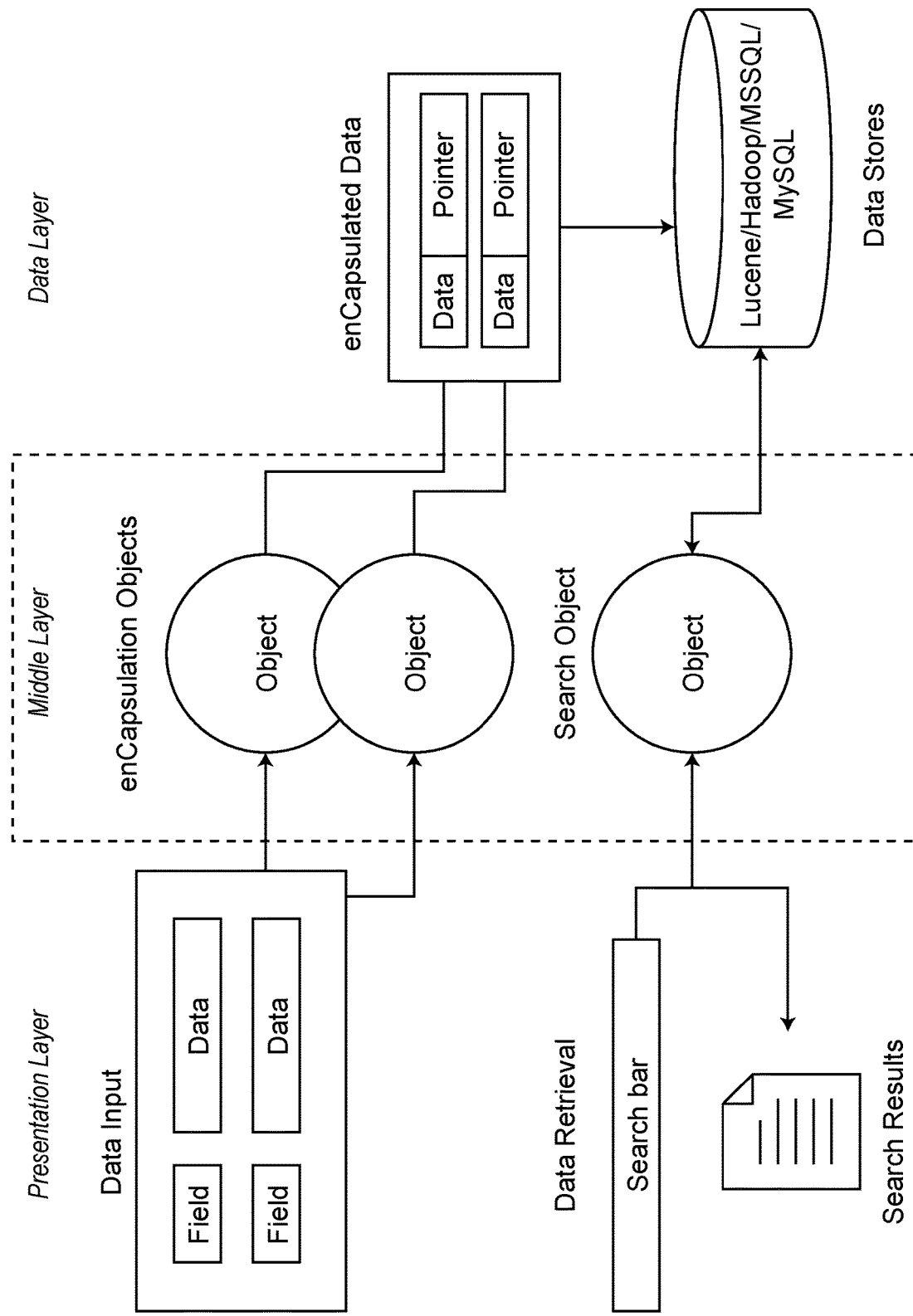
FIG. 3 is a block diagram to further describe the functionality of objects in accordance with the example embodiments.
Figure 4:
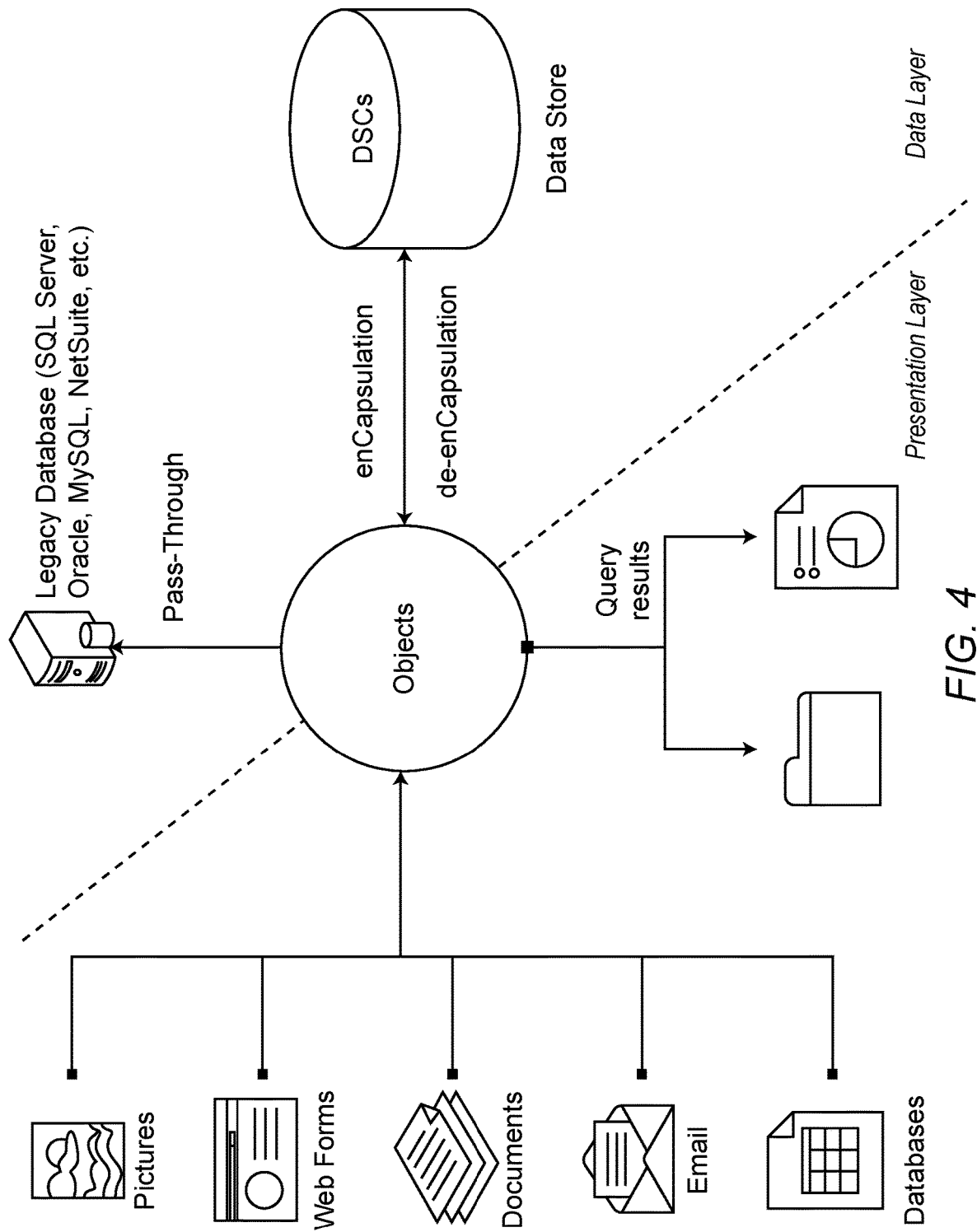
FIG. 4 is a block diagram to highlight the interaction between ingestible digital data in the presentation layer and the objects that create DSCs in the data layer, in accordance with the example embodiments.

FIGS. 3 and 4 are block diagrams to further describe the functionality of the objects in accordance with the example embodiments. Referring to FIGS. 3 and 4, enCapsa Objects (or simply "objects") are part of a simple but powerful programming library that can be installed within any development environment to tie massive amounts of disparate data together. Developers and integrators can use the power of Applicant's encapsulation process in their own projects to bring together digital data from multiple sources to be searched as though it were a single database.

Developers install object libraries, reference them in their code and use the menu functions of the API possesses to pass data from input forms, ingest tools, and links to legacy databases to the data store. Any developer can install a simple search bar on a windows form or on any webpage to search the data store for information from anywhere in the enterprise, or employ any off-the-shelf tool to analyze the global data returned in response to a search query.

The objects have full database emulation, with an ability to store, manage and manipulate massive amounts of data in their own right (possibly on the order of zettabytes (depending on the processing capability of the underlying server/nodes or processors), where 1,024 megabytes=1 gigabyte; 1,024 gigabytes=1 terabyte; 1,024 terabytes=1 petabyte; 1,024 petabytes=1 exabyte; one sextillion bytes ($10^{21}$ bytes or 1,024 exabytes)=1 zettabyte). The objects permit databases and digital data elements with varying structure to exist in the same space. They can be dynamically created, updated and/or removed (i.e., on the fly).

The objects lie within the middle layer (also known as the business layer in a typical application architecture) between the presentation and data layers, although objects may be full participants in the data layer. As shown in FIGS. 3 and 4, objects are configurable to take data from the presentation layer (such as a search query or information request) and then apply it to the data layer. In a sense, objects act like bots or agents ("soldiers" following an order) to break-up and store digital data in the data layer that is ingested from the presentation layer. Data from many different presentation layer sources can be stored in one space, making searching and analyzing of this disparate data very easy.

Thus, the aforementioned objects present a unique way to manage and unite data within the enterprise and between various enterprises. By simply placing elements of the enCapsa Object API within code, developers and designers can unite vast amounts of disparate data, turning over big data projects from that typically take months into mere minutes.

Figure 5:
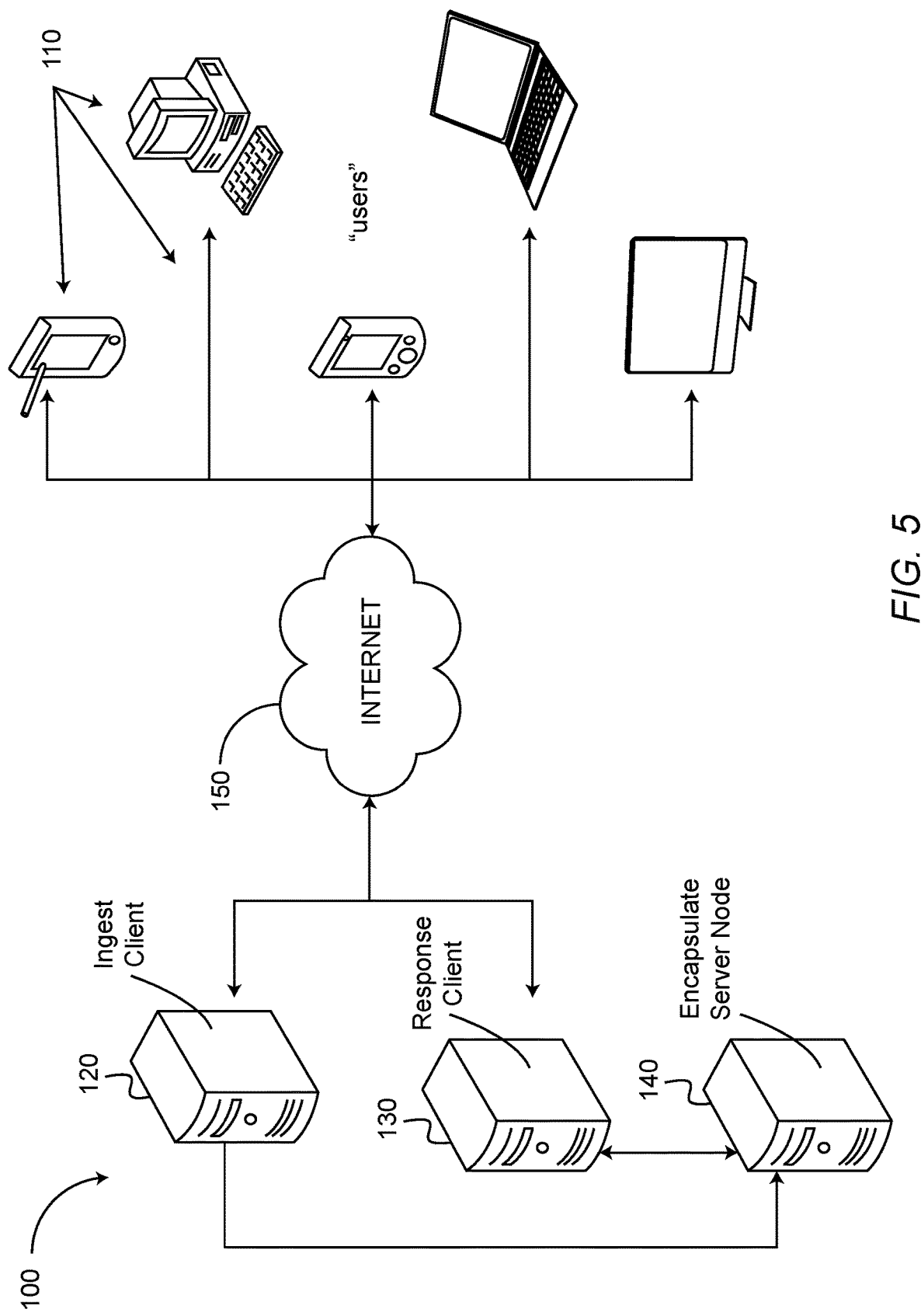
FIG. 5 is a simplified block diagram of a specific computer system for implementing the method.

FIG. 5 illustrates an exemplary general computer system block diagram adapted to implement the method. Computer system 100 is adapted to encapsulate digital data records in multiple, differently structured and unstructured formats that is ingested in the presentation layer from multiple data storage locations. System 100 in general comprises a processing hardware set and a computer readable storage device medium. The processing hardware set is structured, connected and/or programmed to run program instructions stored on the computer readable storage medium so as to iterate the method 1000 of FIG. 2.

Referring now to FIG. 5, computer system 100 includes one or more application servers or clients, shown here as an ingest client 120, a response client 130, and an encapsulate client 140 (also referred to hereafter as a "server node"), which are adapted to interface with one or more computing device(s) employed by users 110 connected over a network in the presentation layer, here shown as the internet 150. Internet 150 may be any network topology, including one or more of a personal area network (PAN), a local area network (LAN), a campus area network (CAN), a metropolitan area network (MAN), a wide area network (WAN), a broadband network (BBN), and the like.

The ingest client 120 makes the connection between the objects within the exemplary method 1000 and the digital data "out in the world". Namely, ingest client 120 ingests data records from the presentation layer that may be in multiple, differently structured and unstructured formats from multiple data storage locations, databases, system and the like.

Within the middle layer, the server node 140 performs the functions to encapsulate the ingested data record as DSCs, Namely, the object-based programming functions within server node 140 execute the separating, splitting, creating, and appending functions of FIG. 2 to both encapsulate and de-encapsulate the ingested data records. The formed DSCs are stored within the data layer in the data store of server node 140. The data store may be internal to the server node(s) 140 or external, or distributed among multiple nodes.

The information represented by these DSCs may then be pulled from the data store of server node 140 within the data later by the response client 130 for display and analysis in the presentation layer. This function essentially reforms (or de-encapsulates using objects) the originally ingested digital data records. In an example, such may be implemented in the form of an information storage request being received from a communication entity (such as user 110) to retrieve one or more of the DSCs from the common data store, for display and review of the original, underlying ingested data record associated with the DSC. Said another way, upon a query by a user 110 to the system 100, the response client 130 accesses the data store in the server node 140 to retrieve results information based thereon. The results are relayed directly back to the user 110 as an immediate reply to the query.

In an example implementation of the method 1000, the newly created DSCs may be stored in a large database such as LUCENE®. Developed by the Apache Software Foundation, LUCENE is a high-performance, full-featured text search engine library written entirely in JAVA. It is a technology suitable for nearly any application that requires full-text search, especially cross-platform.

Figure 6:
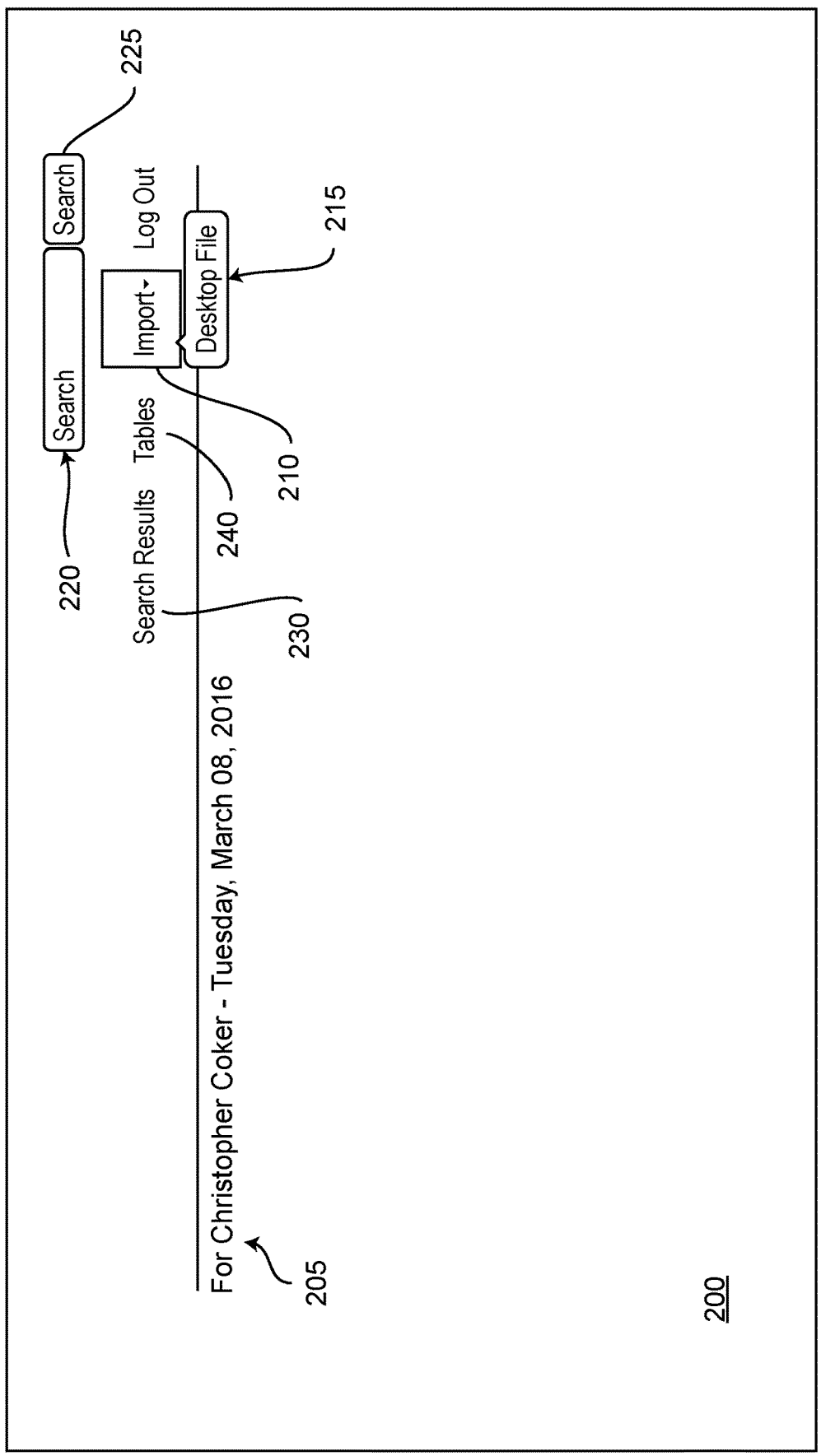
FIG. 6 is screenshot of a webpage illustrating an example data browser, namely to show initiation of an import function consistent with the exemplary method.

FIG. 6 is a screenshot of a webpage to describe how a user may use a data browser service consistent with the exemplary method. Initially, the user might click a hypertext link (not shown) and sign up as a subscriber to the data browser service by entering credential data (ID/PW) and then reading and accepting the EULA. Screenshot 200 of the webpage in FIG. 6 is provided to show initiation of an import function consistent with the exemplary method. In FIG. 6, upon clicking the import action button 210, the user will be able to ingest (manually by drag-and-drop or click, our automated if by machine) all the files they want to encapsulate for search into the gray import space 213.

Figure 7:
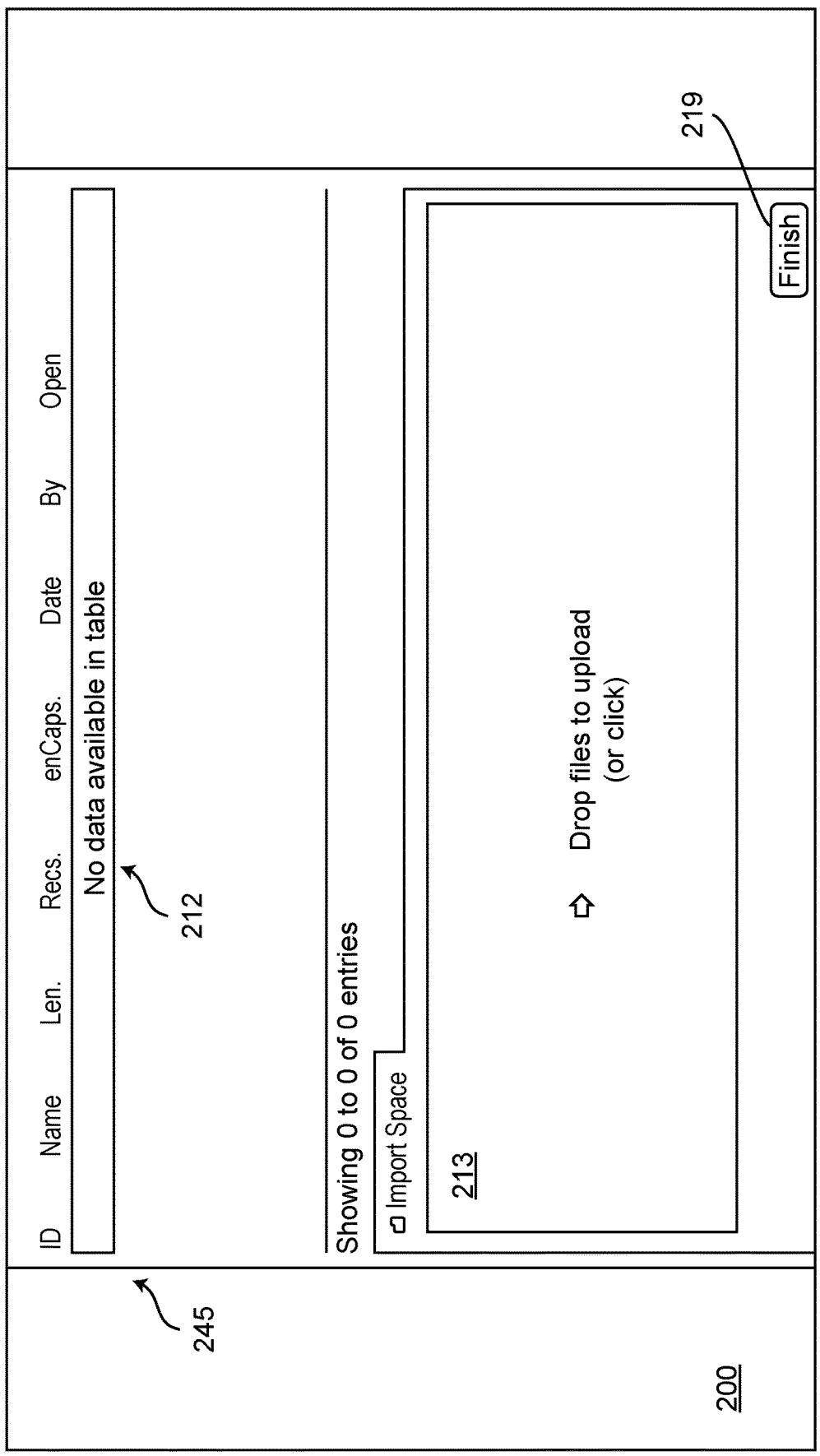
FIG. 7 is screenshot of the same webpage of FIG. 6 to illustrate one way in which digital data is ingested for upload to be encapsulated, through a drag-and-drop means.
Figure 8:
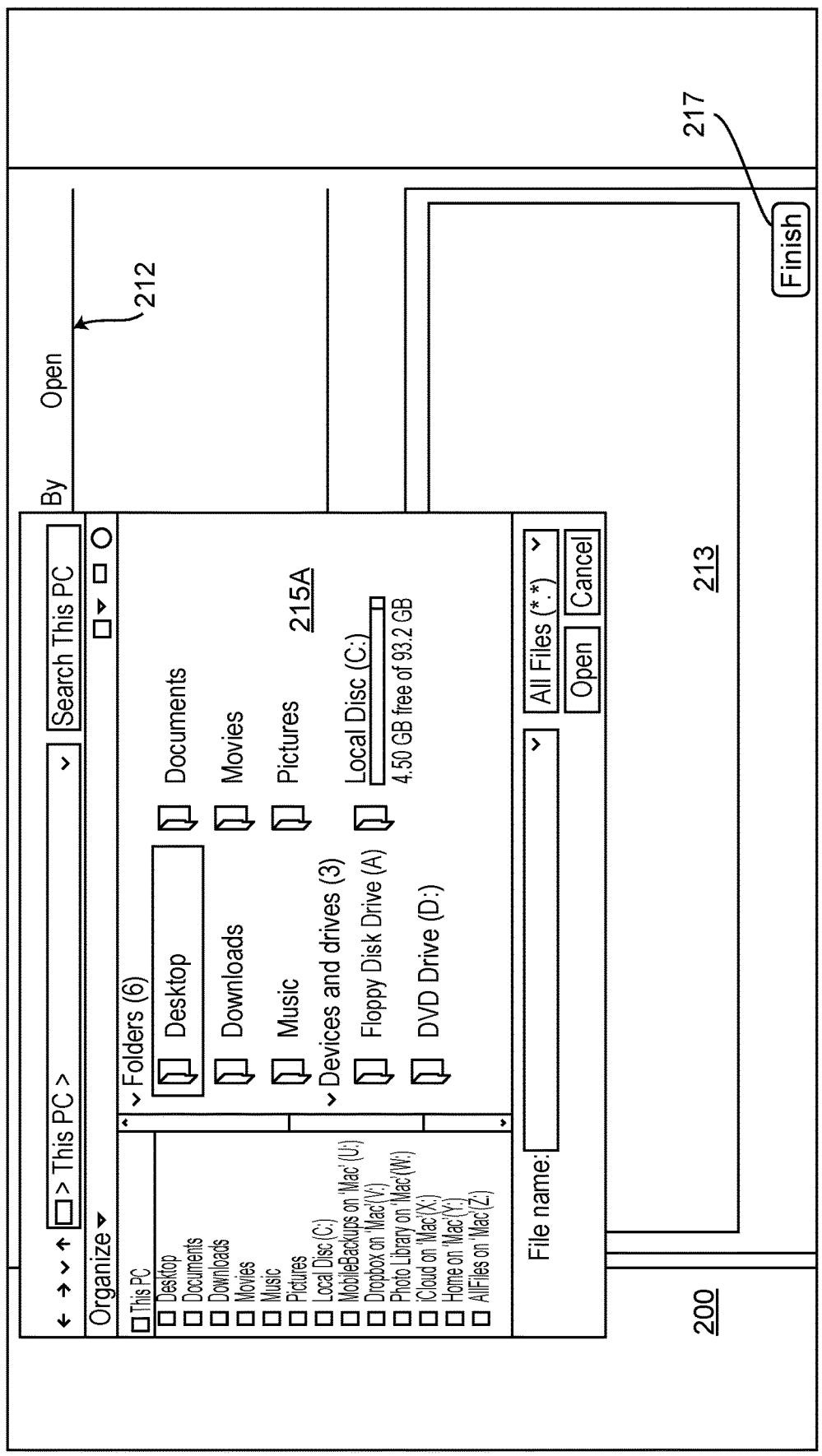
FIG. 8 is a screenshot to show the functionality of dragging and dropping a data file into the system so as to be encapsulated as a DSC and stored in the common data pool.
Figure 9:
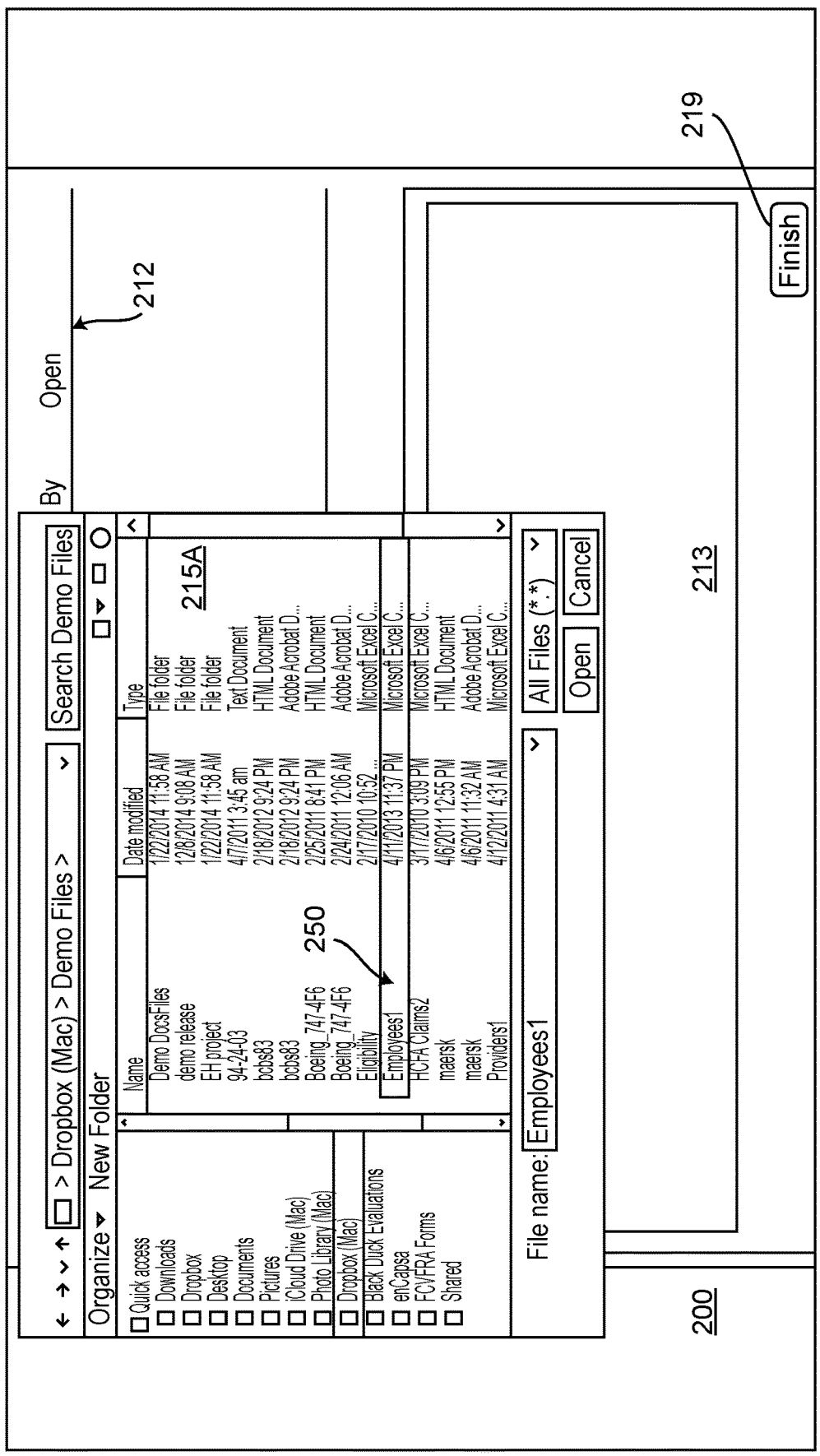
FIG. 9 is a screenshot similar to FIG. 8 but further illustrates selection of a digital data file in the presentation layer.
Figure 10:
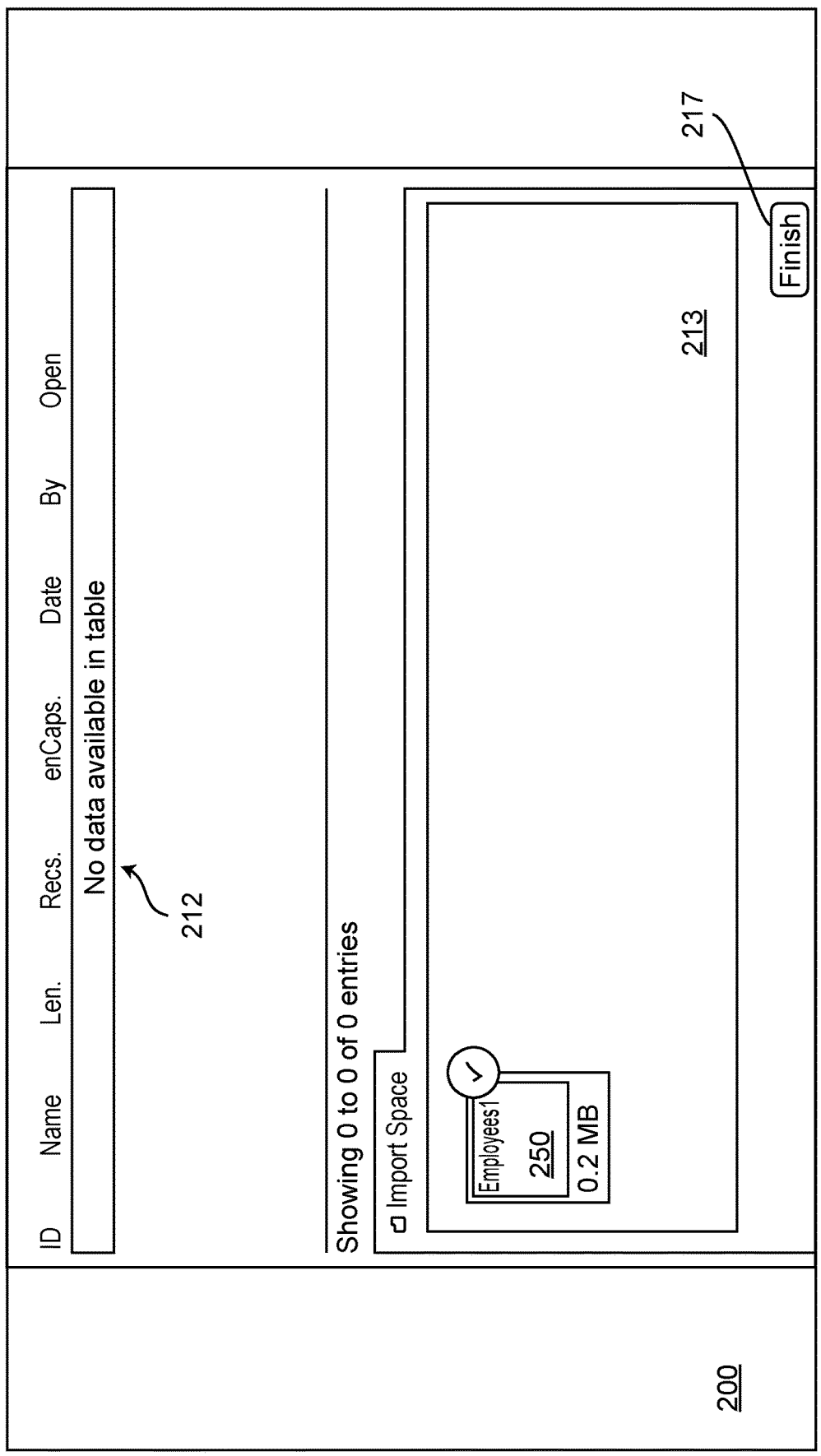
FIG. 10 is a screenshot showing the selected file from FIG. 9 encapsulated and stored in the data store.

FIG. 7 is a screenshot of a webpage showing one way in which digital data is ingested for upload to be encapsulated, through a drag-and-drop means. Namely, FIG. 7 illustrates the kind of tabular data that would be shown (at 245) upon the user clicking the Tables link 240.

Figure 11:
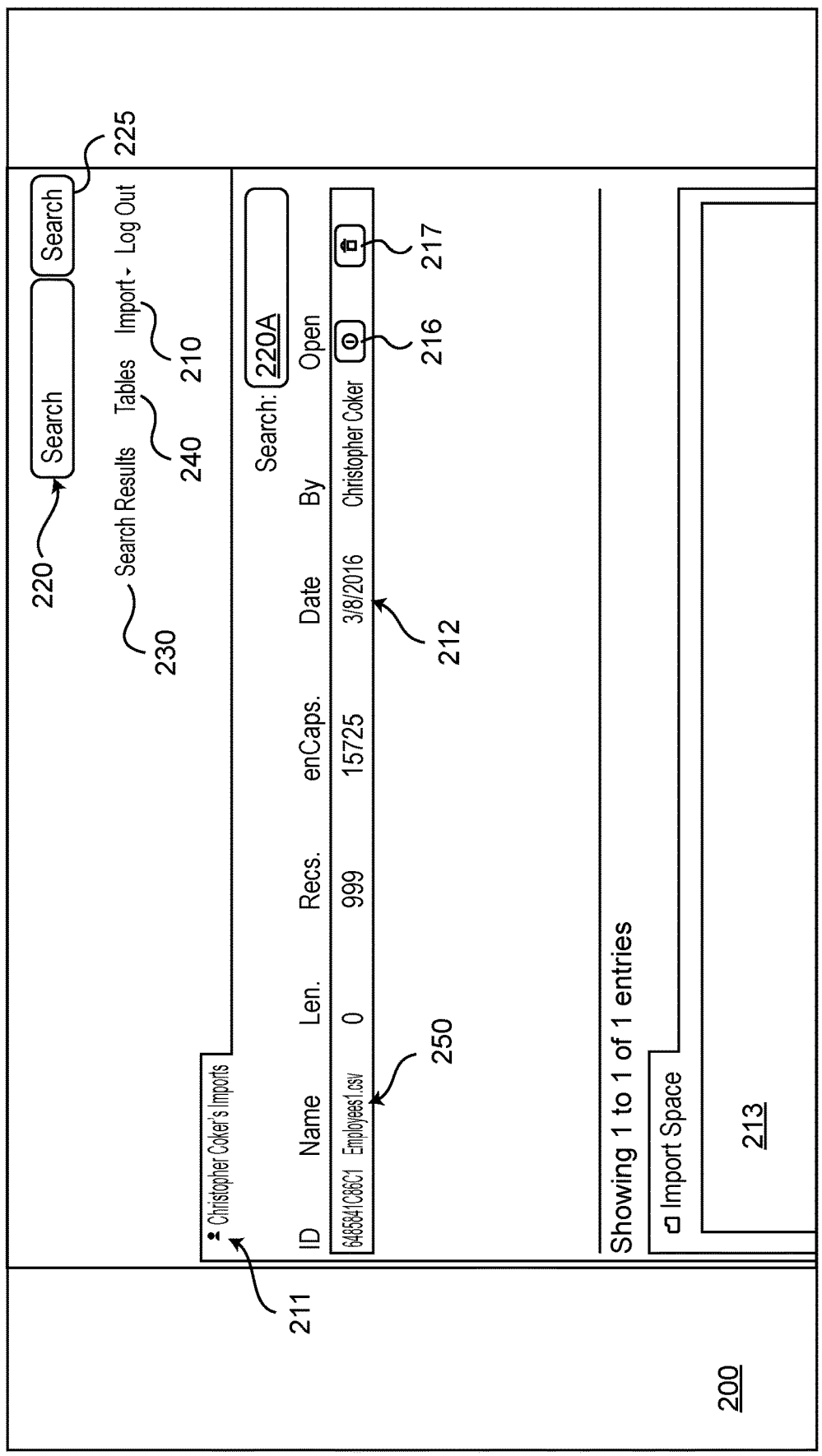
FIG. 11 is a screenshot of a webpage showing import of a data file based on the import execution.

FIGS. 8, 9, 10 and 11 are screenshots to show the functionality of dragging and dropping a selected data file into the system so as to be encapsulated as a DSC and stored in the common data pool. Here in FIG. 8, the user has selected the Desktop file link 215A from the drop-down menu 215 of FIG. 6. This opens a pop-up folder on the user's desktop, whereby he selects (FIG. 9) a specific file 250 for encapsulation, and then drags and drops it into the import space 213. Once all desired files have been encapsulated as DSCs in the data pool (FIG. 10), the user clicks the finish button 219, which will launch a positive visual sign that all files have been encapsulated. This can also be verified by clicking on Tables link 240. In FIG. 11, screenshot 200 indicates that a file 250 has already been ingested, encapsulated and stored as a DSC in the data pool. At this point the user may open the file at 216, delete it at 217, or enter a search query to search the DSCs in the data pool.

Figure 12:
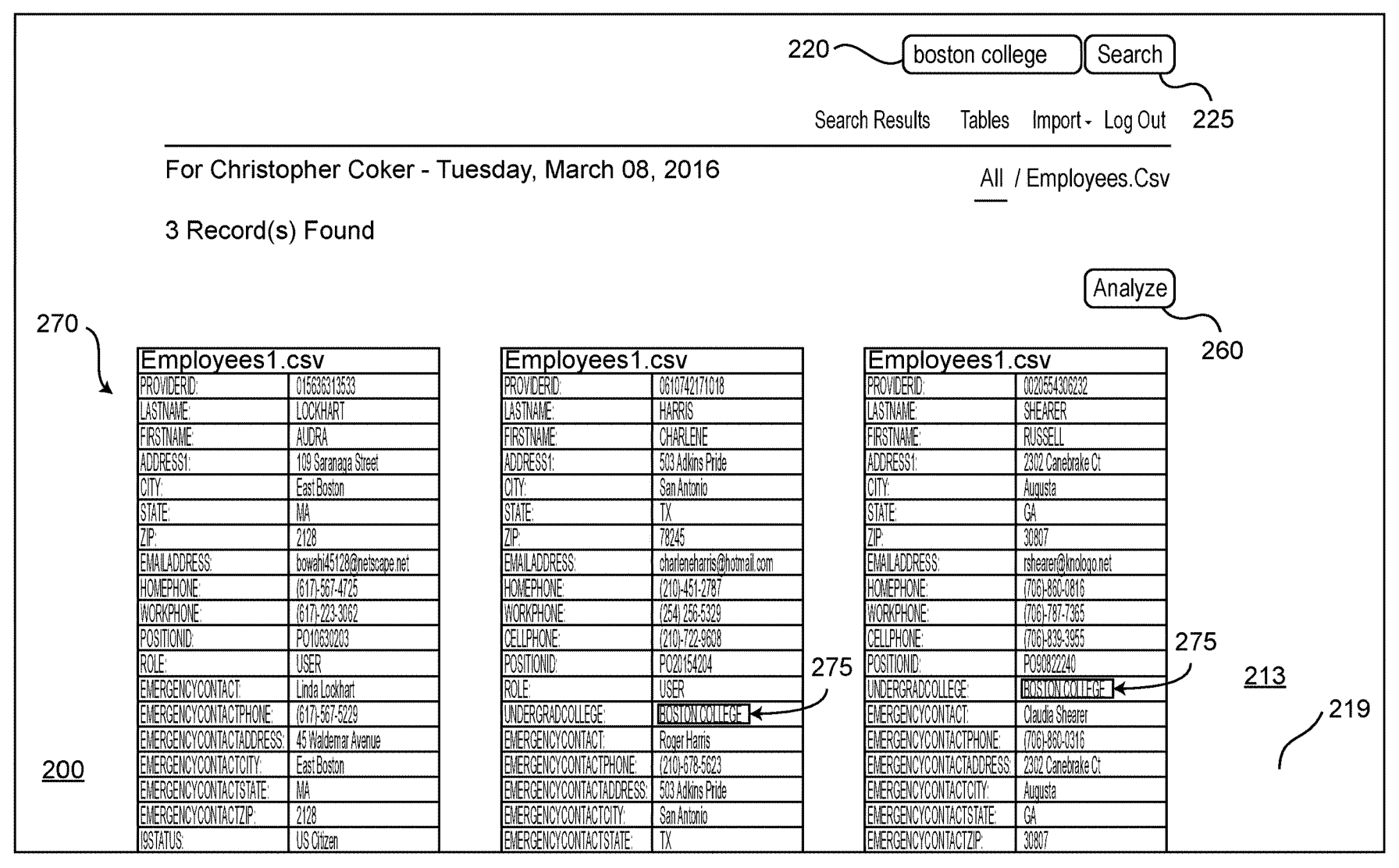
Figure 13:
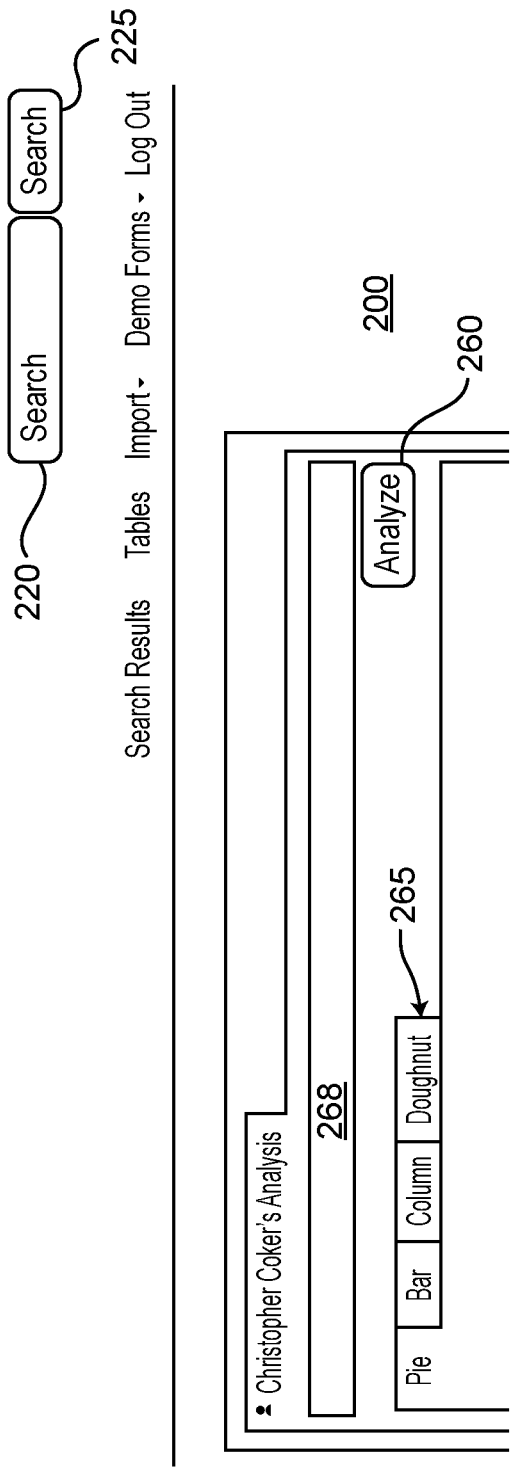
FIG. 13 is a partial view of a screenshot showing an analyze function that may be invoked by the user to analyze the searched results.
Figures 14, 15:
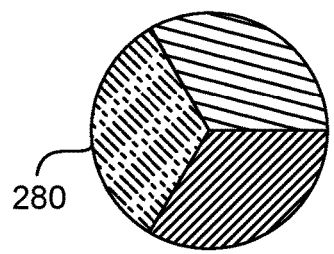
FIG. 14 is the same screenshot as FIG. 13, but illustrates a refinement of the original search query.
FIG. 15 is a screenshot illustrating an example analytics display (pie chart) based on the additional queries, for review by the user.

FIGS. 12-15 highlight a search query process on the encapsulated information stored in the data store. FIG. 12 shows the reformulated data records from the DSCs (results 270) in the data layer (based on a "boston college" query), with the search term highlighted in selected results. The partial view of FIG. 13 shows an analyze function 260 that may be invoked by the user to analyze the searched results. Various analytical results displays 265 may be selected by the user. The user refines their search results in FIG. 14, drilling down by entering a "city" query 269 in search box 268. If desired, the user may drill down even more on their original search by accessing drop-down menu 262. Once satisfied, the user may view specific results for analysis; one example analytics display is shown as a pie chart in FIG. 15. Based on the city search of the file, a graphical representation may be provided based the first, subsequent or all of the search queries, for review by the user.

Based on Applicant's encapsulation schema, a unique kind of protected communications platform has been developed, described herein as a "private mailbox" or "PMB".

PMB is a totally private, absolutely secure, spam-free internet communications platform. PMB is a closed loop" system, with each authorized user having the equivalent of a buddy list. The user may only send and receive messages from those on their list.

PMB is based upon encapsulation, which serves as the behind-the-scenes engine that drives PMB. Similar to as previously described, the server node 140 and associated data store may be used so as to mediate (or broker) a message between two or more parties. Similar to YAHOO®, HOTMAIL®, or GMAIL®, PMB has its own web portal.

Figure 16:
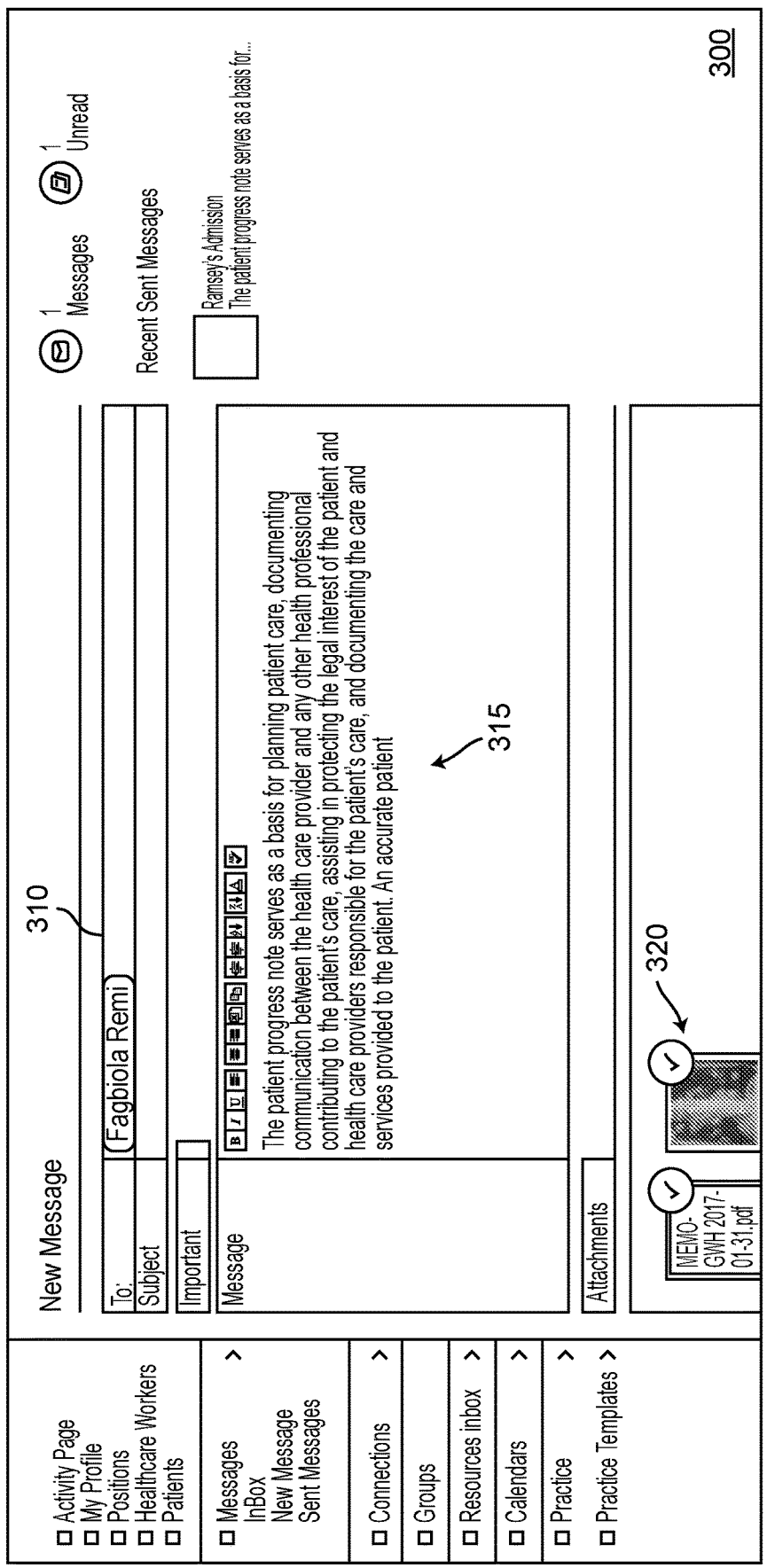
FIG. 16 is a screenshot illustrating a sender preparing a new message to be sent to a recipient via the PMB system.
Figure 17:
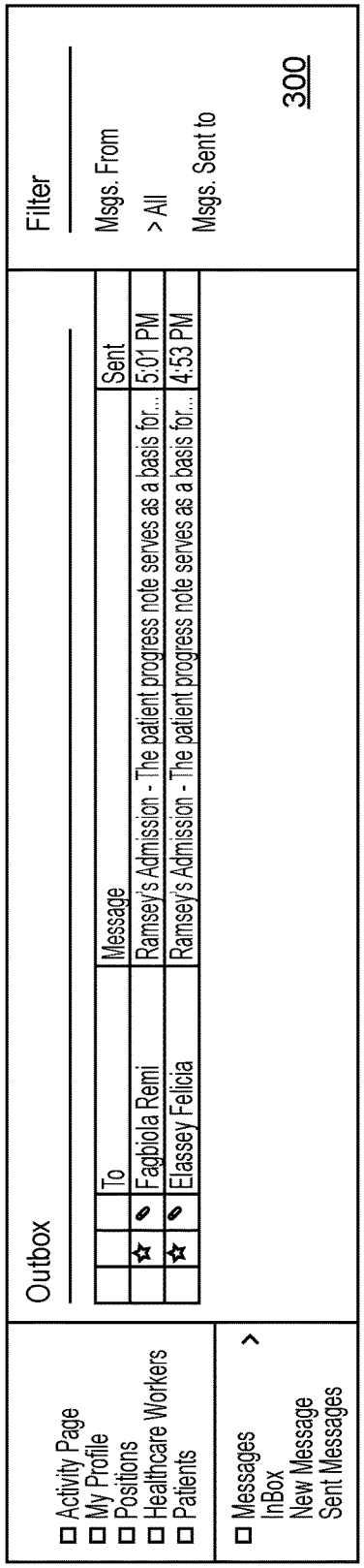
FIG. 17 is a screenshot illustrating the sender's outbox.
Figure 18:
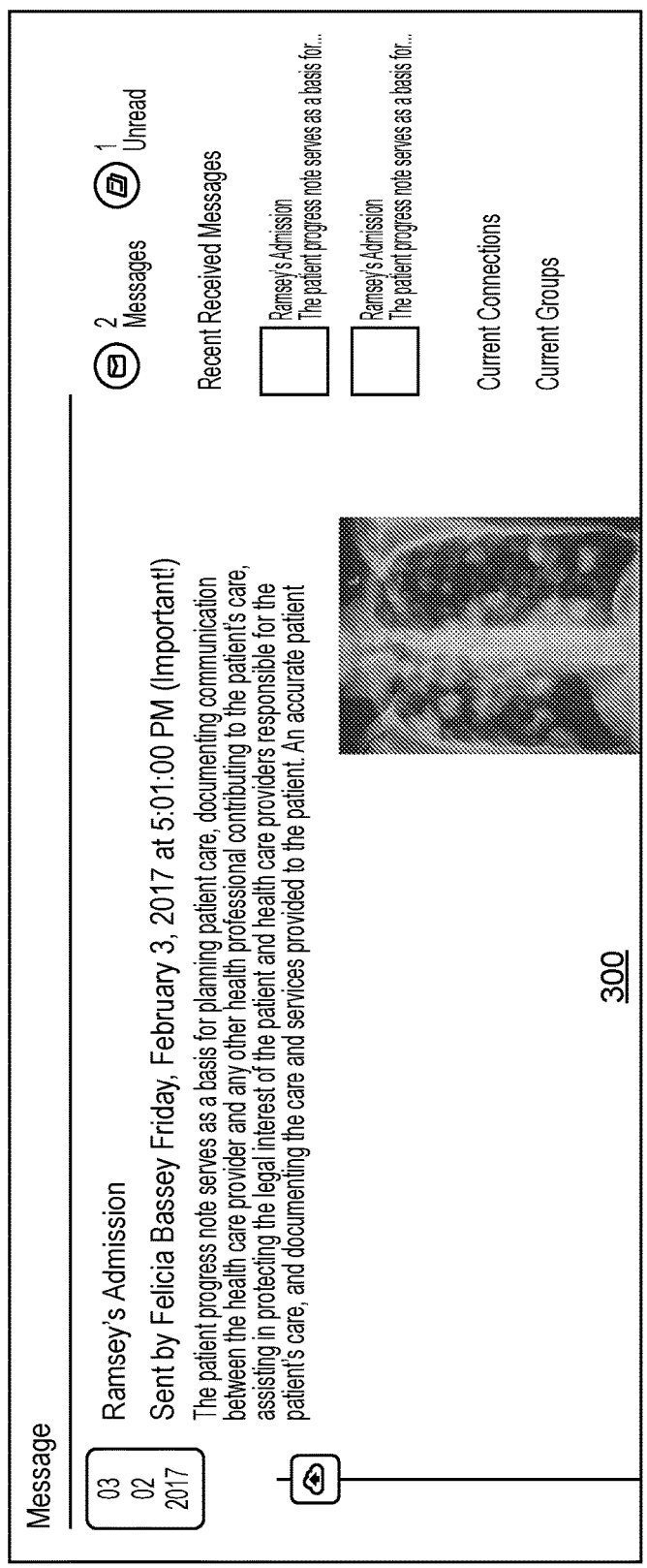
FIG. 18 is a screenshot illustrating the recipient's receipt of the message via the PMB system.

FIGS. 16 through 20 should be referenced in describing the basic operation. To send messages, a user would log on to their account, such as at www.privatemailbox.com. As shown in FIG. 16, the user would then pull up a standard "form" 310, similar to the aforementioned e-mail services' message forms. The message 315 is typed in and sent to one or more recipients. FIG. 17 shows a screenshot illustrating the sender's outbox, and FIG. 18 is a screenshot illustrating the recipient's receipt of the message via the PMB system. Upon sending, objects from the process iterated by the server node 140 break-up the message 315 into the tuple+ pointer structure, thereby creating the DSC that is deposited into the common data store. Should the message 315 contain attachments 320, these too are encapsulated as DSC for storing in the data layer, and then de-encapsulated in the presentation layer to reform the message to authorized recipients, which share the data store.

Should the recipient be on-line at the time the message 315 is sent, PMB acts essentially as an Instant Message. The data store lets the recipient know, in real time, that the message 315 has been delivered. If they are not on-line, PMB acts exactly as e-mail, and the de-encapsulated message 315 is stored in the recipient's in-box. When the recipient responds, the reverse happens. Their message is sent to the encapsulated data store in the forms of DSCs, and the original sender is notified in real time of the reply.

FIG. 19 is a screenshot illustrating the sender adding a message in the form of a chat or IM via the PMB system and FIG. 20 is a screenshot illustrating the recipient's reply to sender. PMB with its encapsulation engine is designed to combine the best features of e-mail, chat, and IM. A notable difference however is that messages 315 processed by the PMB system are stored in the enCapsa data store after the session is completed. Traditional chat does not do this. In essence, one can have a running "chat" session over a long period of time, with the messages 315 stored in the encapsulated data store.

Applicant has previously discussed the inherent security provided by encapsulation. This applies to PMB in the same manner. Recall how traditional databases store data in a "rows and columns" approach; this data is sent over the internet in this fashion. This it is predictable. For example, "First name" is always next to "last name". If a hacker gains unauthorized access to the data, and can figure out the relationships between the columns, the data may be used for nefarious purposes. Data sent over the internet is organized the same way. If intercepted at one of the hops, and if the relationships are solved, that data may also be used for unintended purposes.

But as Applicant's process of encapsulation essentially breaks data up and then "spreads" it around (as freely associating DSCs) throughout the common data pool. If someone ever did compromise the data pool, or intercepted an encapsulated message sent over the internet, they would be unable to piece together any meaningful relationships. For example, they may see a social security number, but have no way of knowing who it belonged to. Applicant knows this to be true, as a graduate class of software data scientists at MIT had no success hacking into and then reconstituting meaningful relationships form the data.

PMB messaging does not employ and hard encryption. Encryption is an "add-on", laying over a message like a blanket. It uses "keys" and only authorized users, i.e., those with the keys, may look under the blanket to see the data/message. Encryption thus requires a separate step, as each message has to be encrypted prior to being transmitted. This takes time and absorbs computer memory. Additionally, users of encrypted messages get frustrated using the software.

Encapsulation is organic to the data itself. The data is broken up and only those with authorized access can reassemble it. Since encapsulation is "built into" the PMB system, it is seamless and transparent to users. Users do nothing to obtain the protection afforded by the process. Moreover, Applicant' encapsulation process meets or exceeds standards established by the federal government for the transmission and storage of sensitive information, all done without encryption. For example, most if not all of the data standards set by the government, such as HIPAA, SarOx, GLBA and the like are technology neutral. Until now, the only way to protect this data was through encryption; as such it remains the industry standard by default. Conversely, Applicant' encapsulation process is fully compliant with these regulations without the hassles of encryption. Obviously, the ability to protect sensitive data (such as patient medical data and private financial data records) across communications is much greater with Applicant' technology, as compared to traditional e-mail services. This is yet another unique feature of PMB.

When adopted, PMB further provides a spam-free environment. Traditional e-mail services like YAHOO, GMAIL and MICROSOFT® OUTLOOK® employ SMTP and POP3 (or IMAP) to send and receive electronic mail. SMTP is used to send mail; for OUTLOOK, a TLS encrypted connection is used to encrypt message content sent through port 25 (port 587 if 25 blocked). The e-mail program uses POP3 with SSL encryption to receive messages, via port 995, and employs IMAP protocol with SSL encryption to copy or mirror email stored on an email server to the user's desktop or device, via port 993.

Look as these ports as a gateway, one that is cracked open like a door. Anyone monitoring one of those ports during a message hoop can easily send/receive messages using the same protocol. Spammers exploit this, sending unwanted content right to the sender's or recipient's "open door".

Conversely, Applicant's PMB does not utilize any of the above protocols for messaging/communications. It is equivalent to a private network. Only those invited into the network are able to send/receive messages between each other. Thus in the simplest of terms, SPAM would "bounce off" the PMB server nodes, hence spam filters are superfluous.

Projected Uses of Applicant's Technology. The following TABLE 1 summarizes the feasibility of integrating the above-described encapsulation technologies into various market streams and industries, as well as government and law enforcement. Although these only represent a few exemplary market segments, others are viable.

TABLE 1

POTENTIAL USE CASES

| MARKET SEGMENT | APPLICATIONS |
|---|---|
| Search Engines (Google, Bing, Yahoo, Ask . . .) | Extend the capability of search engines to report more detailed and accurate search responses based on ability to aggregate disparate information from multiple storage sources |
| | Increase the speed of data aggregation by encapsulating all found disparate data prior to applying the search criteria |
| Operating Systems | Redesign storage and retrieval file systems to eliminate locating, indexing and management issues associated with aggregating disparate data |
| | Increase efficiency of integrating the functionality of desktop and mobile operating systems (OSX & IOS, Windows & Android, interaction with those OSs) |
| Hardware (Chip) Design | Solid State storage devices that incorporate encapsulation into their format schema instead of existing data organization structures (FAT 32, GUID, etc.) |
| Governmental (Local, State, National) | Consolidate regional, local, departmental and interagency data bases |
| Healthcare | Information consolidation of patient data records from multiple, disparate databases and the sharing thereof |
| | Access Monitoring |
| | Drug conflict alerts |
| | Mobile trauma monitoring and treatment (EMT's, Medivac, Remote Medical Services . . .) |
| | Real Time patient monitoring (Local & Remote) |
| Traditional Database Providers (Oracle, SAP, FileMaker, Access . . .) | Consolidating and maintaining multiple disparate data sources internally |
| | Consolidating and maintaining multiple disparate data sources for clients (Cisco Model) |
| | Designing and implementing multi-field disparate databases using enCapsa instead of indexes and tables |
| Intelligence Community | Monitor information and surveillance of multiple, disparate data sources |
| | Monitor known or suspected terrorists, terrorist cells, etc. from the aggregation of disparate data |
| | Direct connection to disparate communications, news sources, telecommunications and satellite transmission sources |
| | Security analytics from disparate sources in real time, readiness and alert systems |

Referring to TABLE 1 and in a specific healthcare use-case scenario, implementation of the encapsulation schema within a healthcare concern's existing IT infrastructure would enable the creation of a data warehouse for patient medical records in a fraction of the time needed by traditional data vendors, as the example process eliminates the time, complexity and expense of data mapping. For implementation, several modules could be devices, two (2) of which are described briefly as exemplary of the possibilities.

The first could be a Case Management Module (CMM) for the healthcare concern. Here, all data within a hospital's infrastructure would be aggregated to create a holistic view of an individual patient or group of patients. The data store of system 100 could be implemented in the form of a CMM pointing to the existing IT infrastructure or laying as middleware on top of one or more server nodes. The CMM would support the creation and storage of an electronic file folder on each patient that is automatically updated as new data (on the patient) is created within the hospital environment. Case managers thus would only need to open the folder to see the latest updates on a patient. Alerts could be programmed to inform case managers when things have changed.

The second exemplary product could be a Readmissions Predictive Modeling Module (RPMM). Using data provided by a state's Department of Health and that of the healthcare concern, a RPMM with powerful algorithms could be created to predict the likelihood of a hospital readmissions based on data produced by new patients upon their initial admission. By identifying these potential readmissions and thereby focusing care, punitive readmission penalties can be meaningfully reduced.

Applicant's method of encapsulation greatly enhances the process of ingesting and retrieving multiple disparate forms of data. Applicant's method and system of encapsulation creates an immediately accessible data pool of any and all digital data and metadata ingested into it. If the data sources are directly connected to enCapsa, the data is maintained and accurately reported in real time with no formatting or structuring time lag. This can include photos, emails, video, data base information (regardless of format), forms, documents, PDF's, etc., virtually any digitized data. The example method does this without any formatting or structuring of the data. Once ingested into the data pool, the example method and system may use the LUCENE search engine (as an example) to search and extract ingested data for analysis, reporting, alerts, etc. Accordingly, the encapsulation method is not a database itself, but a way of storing disparate data in another store or database for search and retrieval.

As information has a shelf life, Applicant's method and system of encapsulation offers real-time access. Computers need data; humans need information. Applicant' proposed systems and methods provide the business end user all of its information fast, in real time, and ad hoc. In other words, 100% of a company's data is available for analytics/analysis, versus the current average of about 12% today. Applicant's technologies therefore enable the big enterprise to see all of their information without barriers. As such, the encapsulation techniques provide a "new way to database" in the $21^{st}$ century.

In a simple working example, the encapsulation process has been shown to process complex disparate data (such as patient medical records) at a rate in excess of 100,000 patient health records per second so as to provide a fully searchable and intelligent database. This is the equivalent of greater than a terabyte (TB) per hour rate. In contrasting this with the conventional data mapping process, the same may take several hundred man-hours employing manual and software-accelerated data mapping techniques.

The example method and system may provide even further advantages and benefits. The ability to have unfettered access to all company data in an organized, searchable format thus enables better business decisions to be made based on the information available, thereby enhancing the ability to extract more actionable and relevant information. Also, Applicant's method and system may provide for substantial cost savings as a further benefit.

The present invention, in its various embodiments, configurations, and aspects, includes components, methods, processes, systems and/or apparatuses substantially as depicted and described herein, including various embodiments, sub-combinations, and subsets thereof. Those of skill in the art will understand how to make and use the present invention after understanding the present disclosure.

The present invention, in its various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

I claim:

1. A method of encapsulating digital data records having multiple, differently structured and unstructured formats, each of the data records representing an original data record that is ingested from multiple different and disparate data storage locations, comprising:
    separating each ingested original data record into a plurality of tuples,
    splitting out a data part and a fieldname part from each tuple,
    creating a pointer by combining the fieldname part, a record identifier of the original data record, and a database identifier of the storage location where the original data record was stored,
    appending the created pointer to the data part to form a digital stem cell (DSC), each formed DSC having the same structure and each formed DSC representing encapsulated data of its corresponding ingested original data record, and
    storing each DSC in a single data store so that one or more of the DSCs are subject to retrieval for reconstruction of the original data record at some later time upon a query to the single data store.

2. The method of claim 1, wherein for retrieval and reconstruction each DSC includes information adapted to be reformed in a presentation layer, upon the query, so as to display the ingested original data record that corresponds to the DSC for analysis.

3. The method of claim 1, wherein ingesting further includes ingesting files containing the data records, the files residing in the multiple data storage locations.

4. The method of claim 1, wherein
    the steps of separating, splitting, creating, and appending are executed by object-based programming functions adapted to both encapsulate and de-encapsulate the ingested original data records, and
    the object-based programming functions both create the DSCs and reform the ingested original data records from the DSCs.

5. The method of claim 1, wherein each stored DSC is freely searchable irrespective of the original structured or unstructured format of its underlying ingested original data record, and irrespective of the data storage location from which the data record was ingested, the stored DSCs co-existing without any structural barriers between them in the data store.

6. The method of claim 1, further comprising configuring the stored DSCs as encapsulated information of an extractable or exportable file.

7. A computer system adapted to encapsulate digital data records in multiple, differently structured and unstructured formats that are ingested from multiple data storage locations, the system comprising a processing hardware set and a computer readable storage device medium, wherein the processing hardware set is structured, connected and/or programmed to run program instructions stored on the computer readable storage medium, the program instructions run by the processing hardware set including the steps of claim 1.

8. A search engine for presenting information in a presentation layer based on a query by a user, the search engine including one or more computers and one or more storage devices storing instructions that are operable, when executed by the one or more computers, to cause the one or more computers to perform the steps of claim 1 so as to present information collected in response to the query to the user.

9. A method of encapsulating multiple different data records having an unstructured or structured format, each of the data records representing an original data record and each contained in files stored across multiple databases, at least two databases of which have dissimilar structures, the method comprising:

ingesting files containing the original data records from the databases, and for each file, deconstructing one or more of the original data records contained in the file into one or more sets of elemental parts having the same structure, each of the one or more sets of elemental parts representing encapsulated data of the one or more ingested original data records, and storing the one or more sets of elemental parts in a single data store, wherein the one or more sets of elemental parts are subject to retrieval for reconstruction of the one or more original data records at some later time upon a query to the single data store, and the one or more sets of stored elemental parts adapted to be freely indexed and searchable irrespective of the original unstructured or structured format of the one or more sets of elemental parts' corresponding original data records, and irrespective of the database containing the file from which the one or more original data records were ingested.

10. The method of claim 9, wherein the deconstructing of the one or more original data records into one or more sets of elemental parts further includes separating each ingested original data record into a plurality of tuples.

11. The method of claim 10, wherein the deconstructing of the one or more original data records into one or more sets of elemental parts further includes splitting out a data part and a fieldname part from each tuple.

12. The method of claim 11, wherein the deconstructing of the one or more original data records into one or more sets of elemental parts further includes creating a pointer by combining the fieldname part, a record identifier of the data record, and a database identifier of the storage location where the data record was stored.

13. The method of claim 12, wherein the deconstructing of the one or more original data records into one or more sets of elemental parts further includes appending the created pointer to the data part to form a digital stem cell (DSC), each formed DSC having the same structure.

14. A computer system adapted to encapsulate digital data records in multiple, differently structured and unstructured formats accessible from multiple data storage locations, each of the digital data records representing an original data record, comprising:

an ingest client adapted to ingest a plurality of the original data records from the multiple data storage locations, a server node adapted to iterate object-based programming functions therein that:

separate each ingested original data record into a plurality of tuples, split out a data part and a fieldname part from each tuple, create a pointer by combining the fieldname part, a record identifier of the data record, and a database identifier of the storage location where the original data record was stored, append the created pointer to the data part to form a pointer pair which represents encapsulated data of its corresponding ingested original data record, each formed pointer pair having the same structure, and store the formed pointer pairs in a single data store of the server node, and a response client adapted to, upon a user query to the system, de-encapsulate selected pointer pairs in the data store based on the query store, for display and analysis by the user of the corresponding original ingested data records associated with the pointer pairs.

15. The system of claim 14, wherein the stored pointer pairs in the data store are adapted to be freely indexed and searchable irrespective of the original unstructured or structured format of the pointer pair's corresponding original data record, and irrespective of the storage location from which the corresponding original data record was ingested.

* * * * *